United States Patent [19]
Murphy et al.

[11] Patent Number: 5,249,254
[45] Date of Patent: Sep. 28, 1993

[54] HARD DISC DRIVE FOR USE IN A MULTIPLE DRIVE DATA STORAGE SYSTEM AND METHOD OF OPERATION

[75] Inventors: Robert D. Murphy, Yukon; David C. Waugh, Oklahoma City, both of Okla.; Mark A. Hickl, Austin, Tex.; Clyde E. Goodner, III, Oklahoma City, Okla.

[73] Assignee: Seagate Technology, Inc., Scotts Valley, Calif.

[21] Appl. No.: 786,336

[22] Filed: Oct. 31, 1991

[51] Int. Cl.$^5$ ............................................ G05B 19/29
[52] U.S. Cl. ............................ 388/907.5; 318/603; 360/73.03; 369/189
[58] Field of Search ............... 360/73.02, 73.03, 73.06; 369/266, 189; 388/907.5, 809-815, 832-833; 395/425; 318/600-603

[56] References Cited

U.S. PATENT DOCUMENTS

| | | | |
|---|---|---|---|
| 4,514,671 | 4/1985 | Louth | 388/907.5 |
| 4,890,045 | 12/1989 | Ishizuka | 360/73.03 |
| 5,159,503 | 10/1992 | Mitamura et al. | 360/73.02 |

Primary Examiner—David C. Nelms
Assistant Examiner—K. Shami
Attorney, Agent, or Firm—Edward P. Heller, III; Bill D. McCarthy; Louis W. Watson

[57] ABSTRACT

A data storage system comprised of a plurality of disc drives which each comprise a plurality of data storage discs rotated by a polyphase motor. Each disc drive has a servo system for radially positioning transducer heads proximate the disc surfaces and generating an index signal for a selected orientation of the discs. A reference signal generator in each disc drive produces a reference signal at each of a succession of time intervals equal to the desired period of rotation of the discs and the disc drives are interconnected to enable each disc drive to sense a reference signal generated by any other disc drive. Each disc drive includes a microcomputer that is periodically interrupted and, during the interrupt, transmits the reference signal generated by the disc drive to the other disc drives in the absence of reception of a reference signal from another disc drive prior to the interrupt to provide a common reference signal for all of the disc drives. The speed of the motor of each disc drive is controlled in relation to the time interval between generation of the index signal in the disc drive and generation of the common reference signal. Alternatively, each disk drive can be operated independently to control the motor speed in relation to the time between successive index signals.

10 Claims, 21 Drawing Sheets

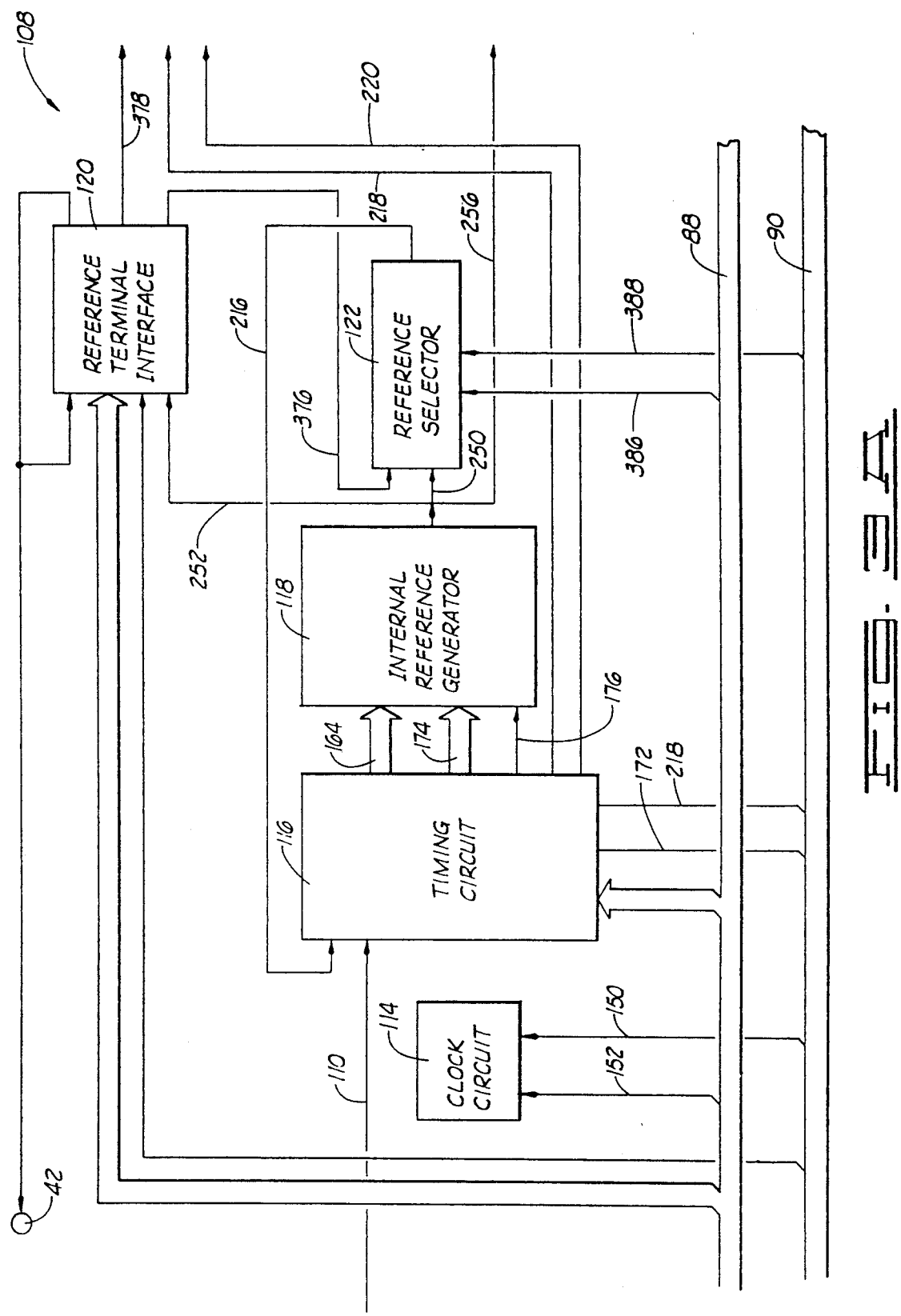

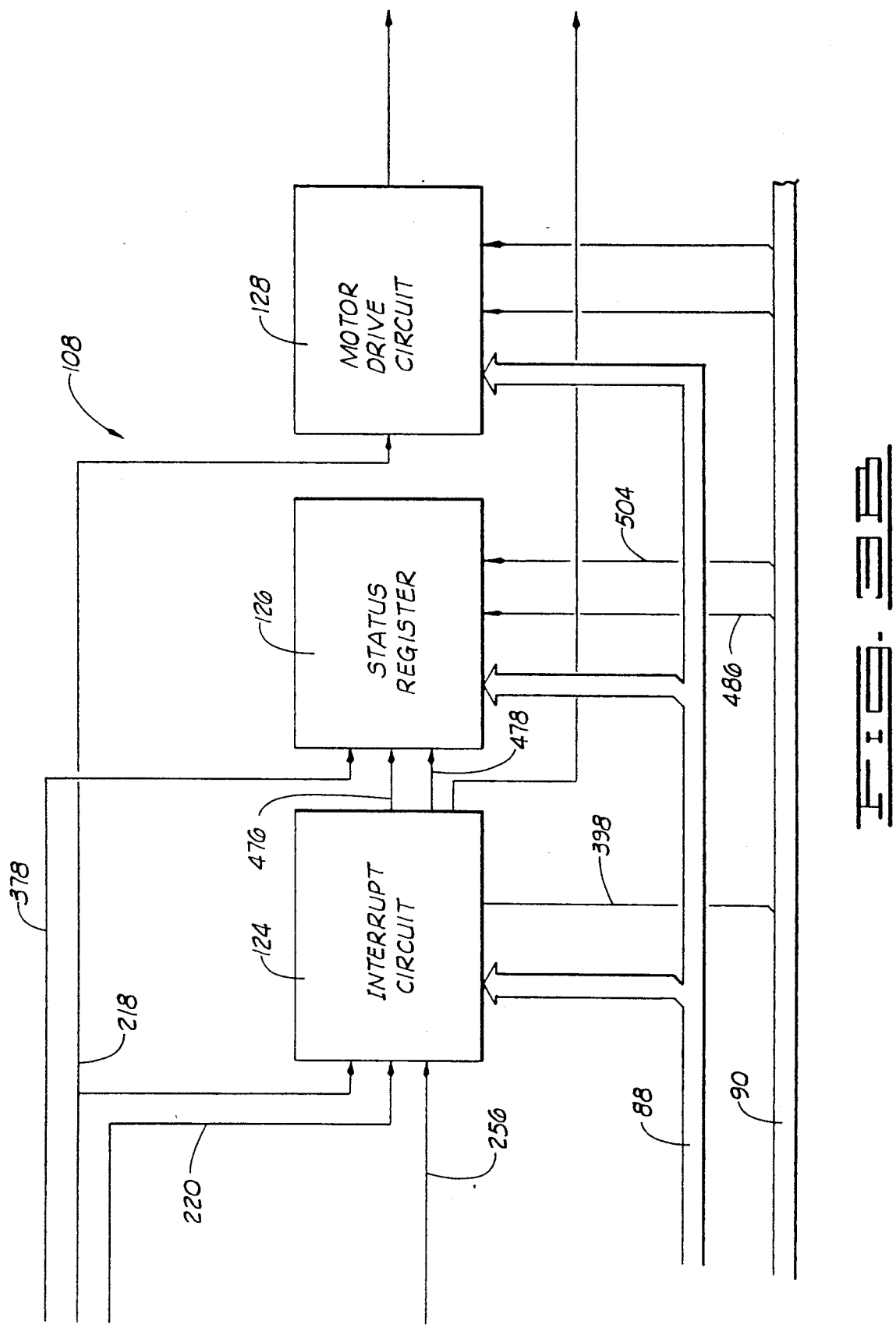

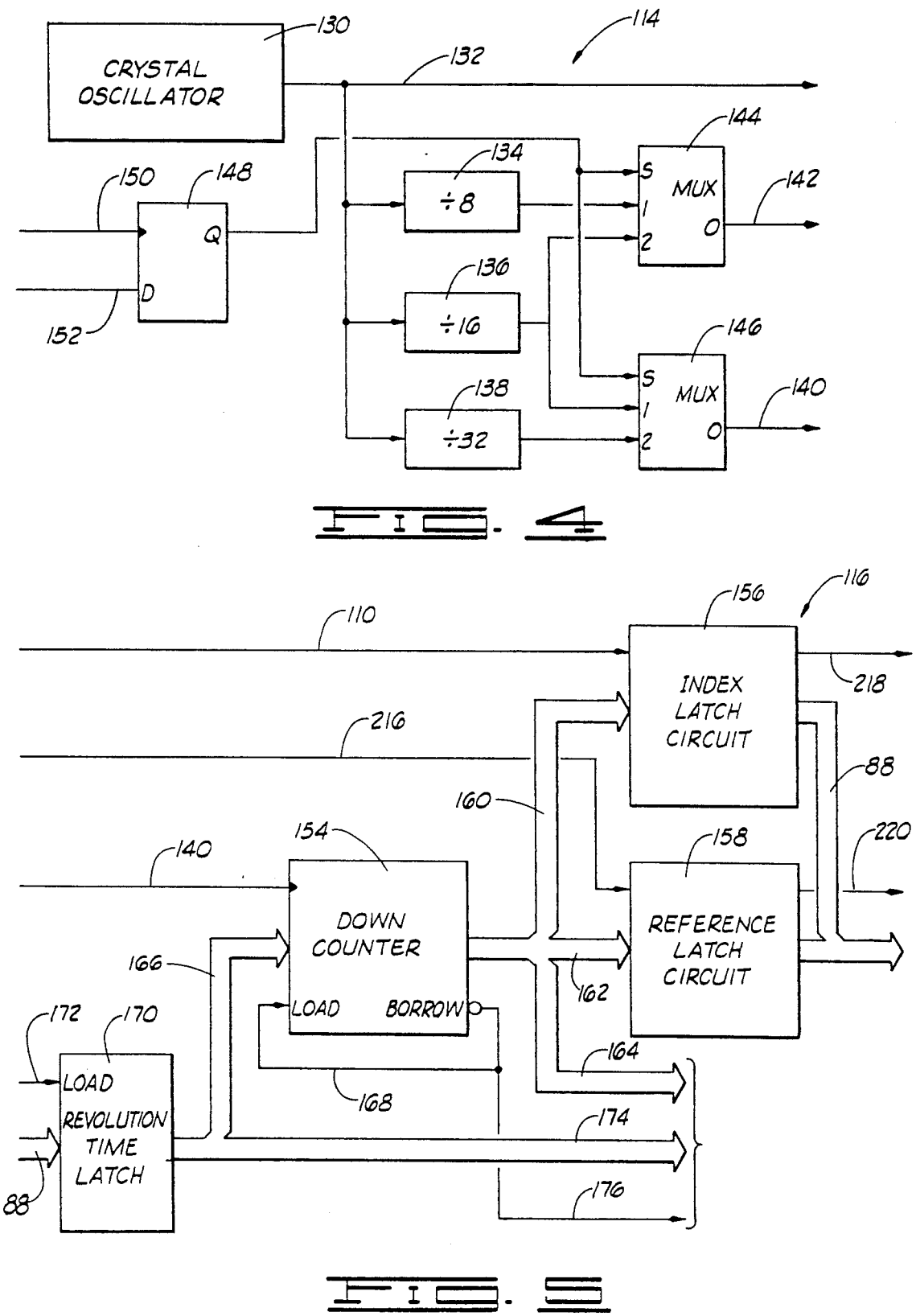

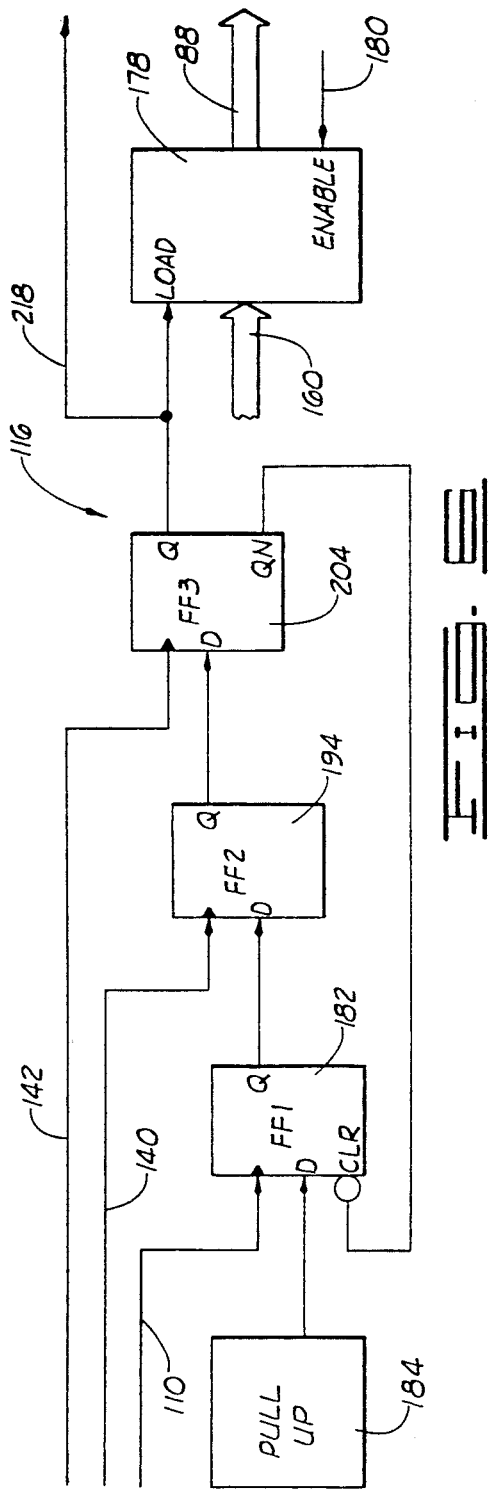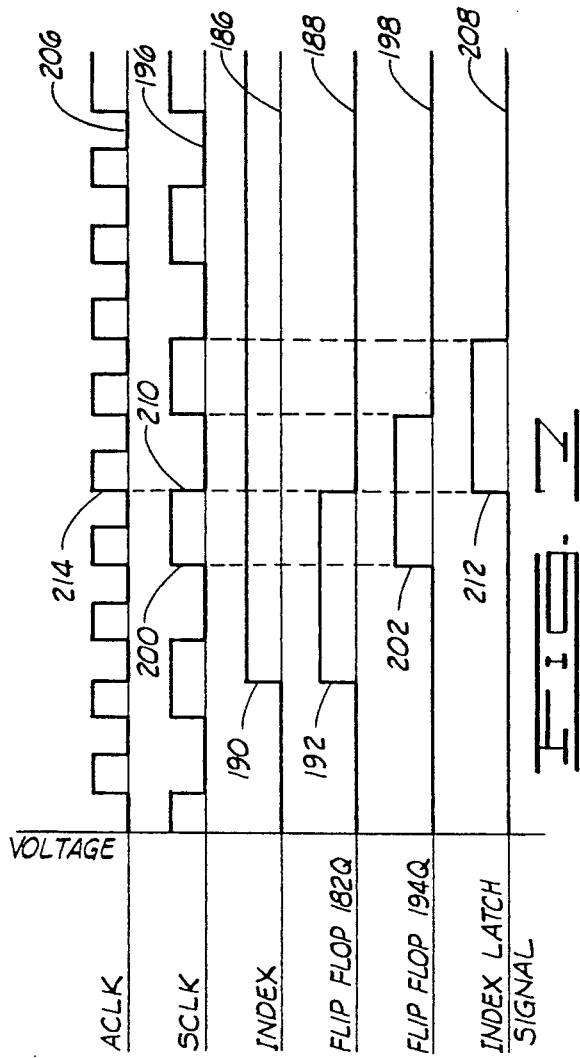

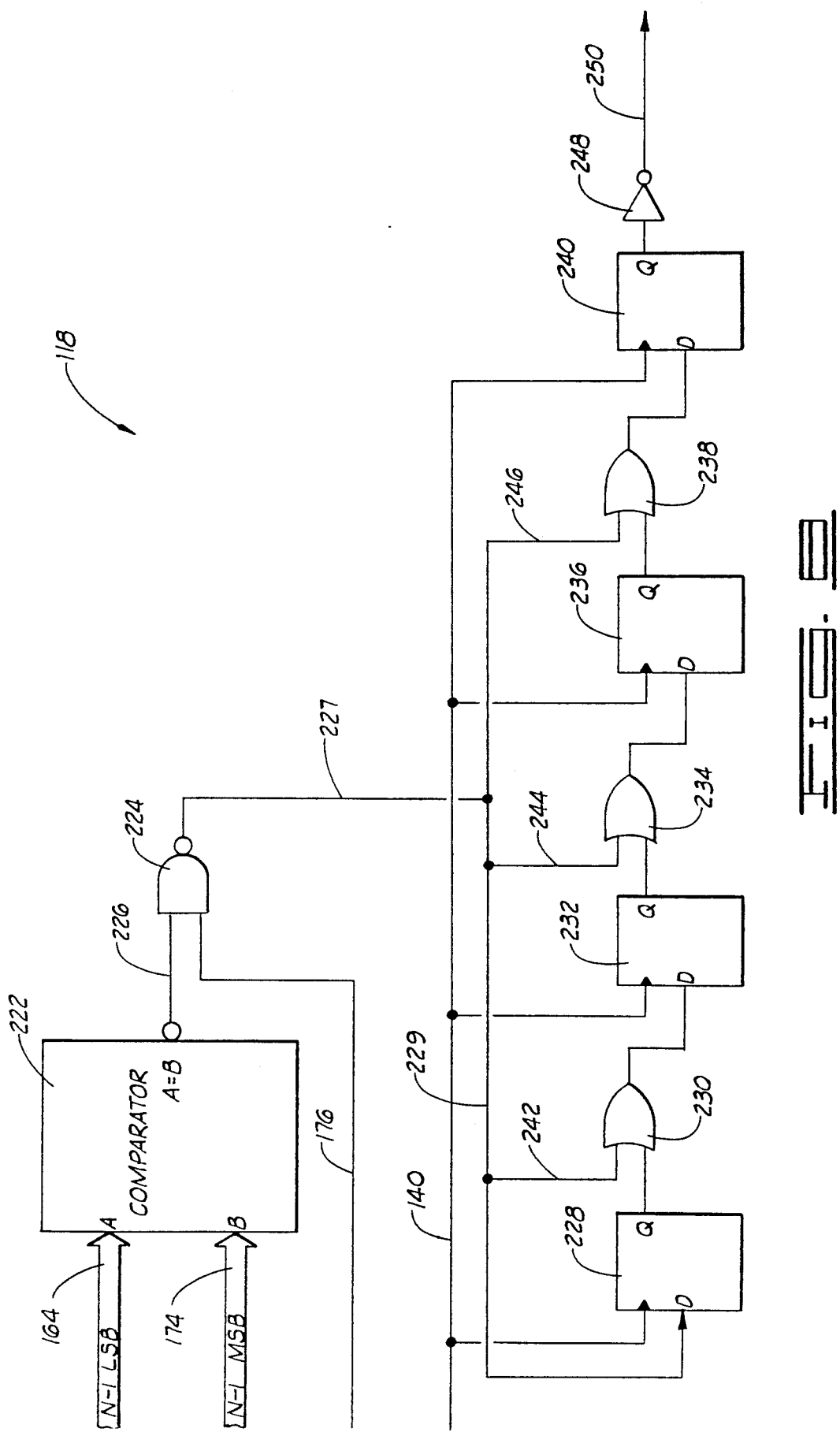

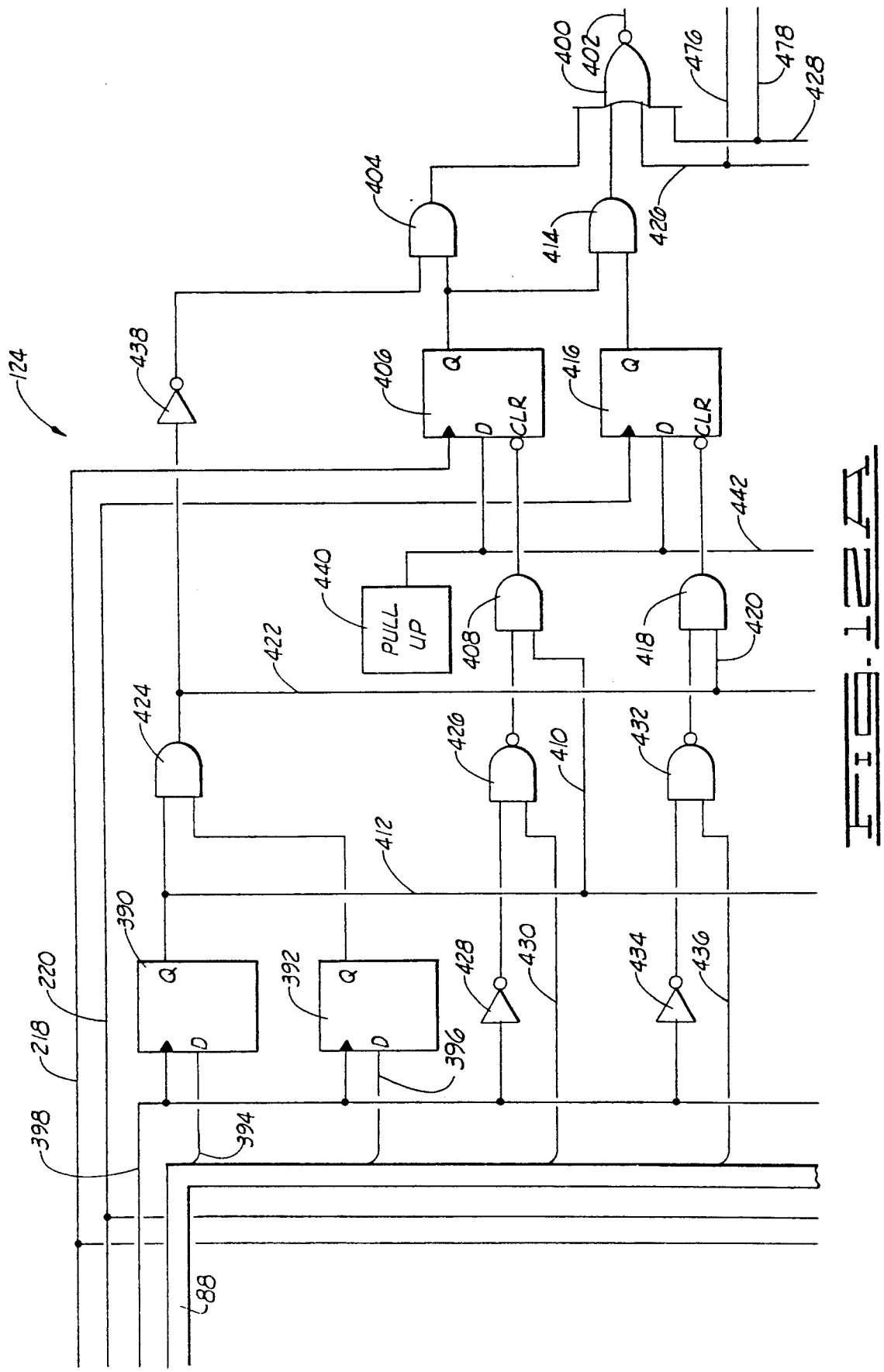

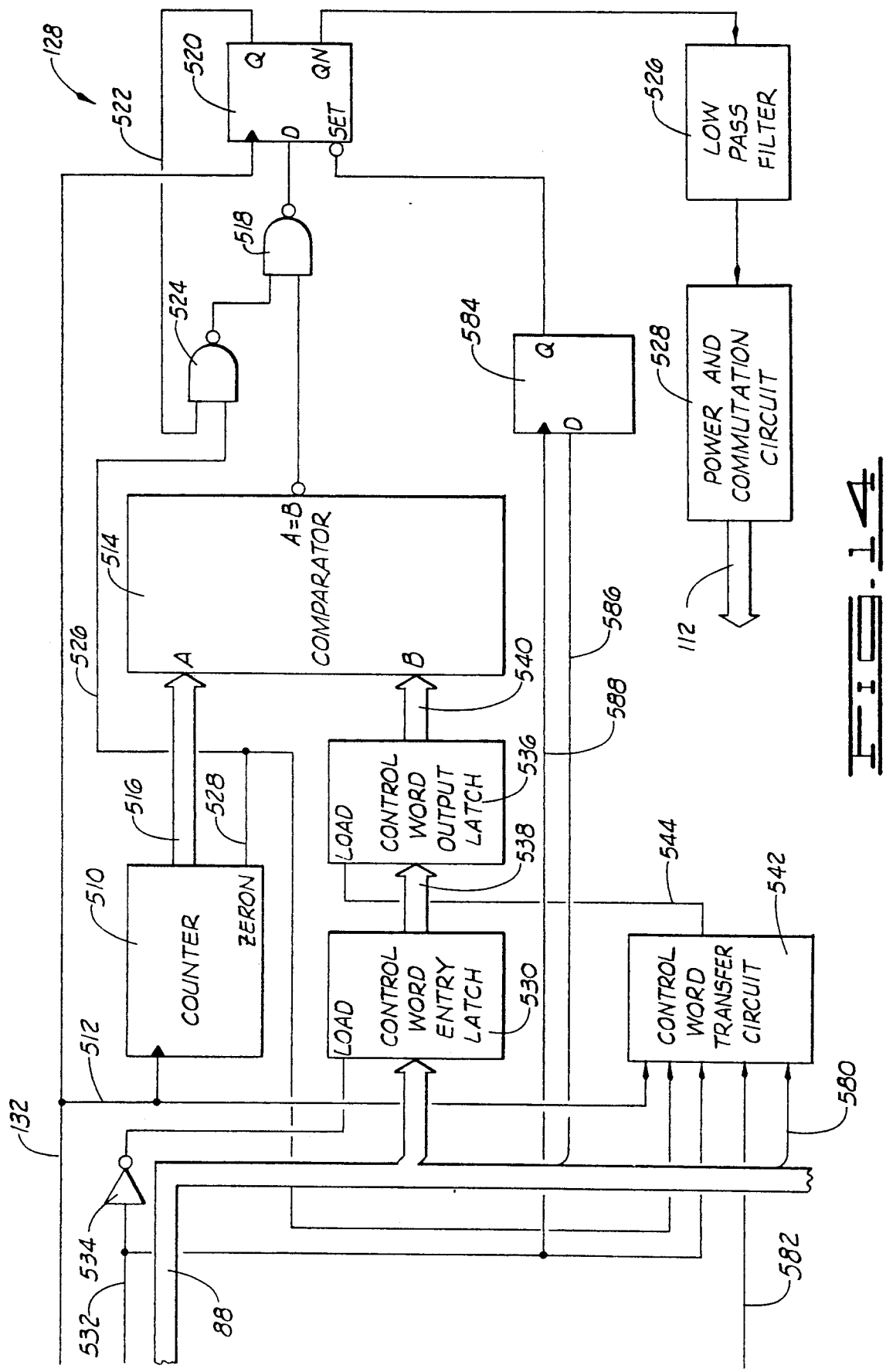

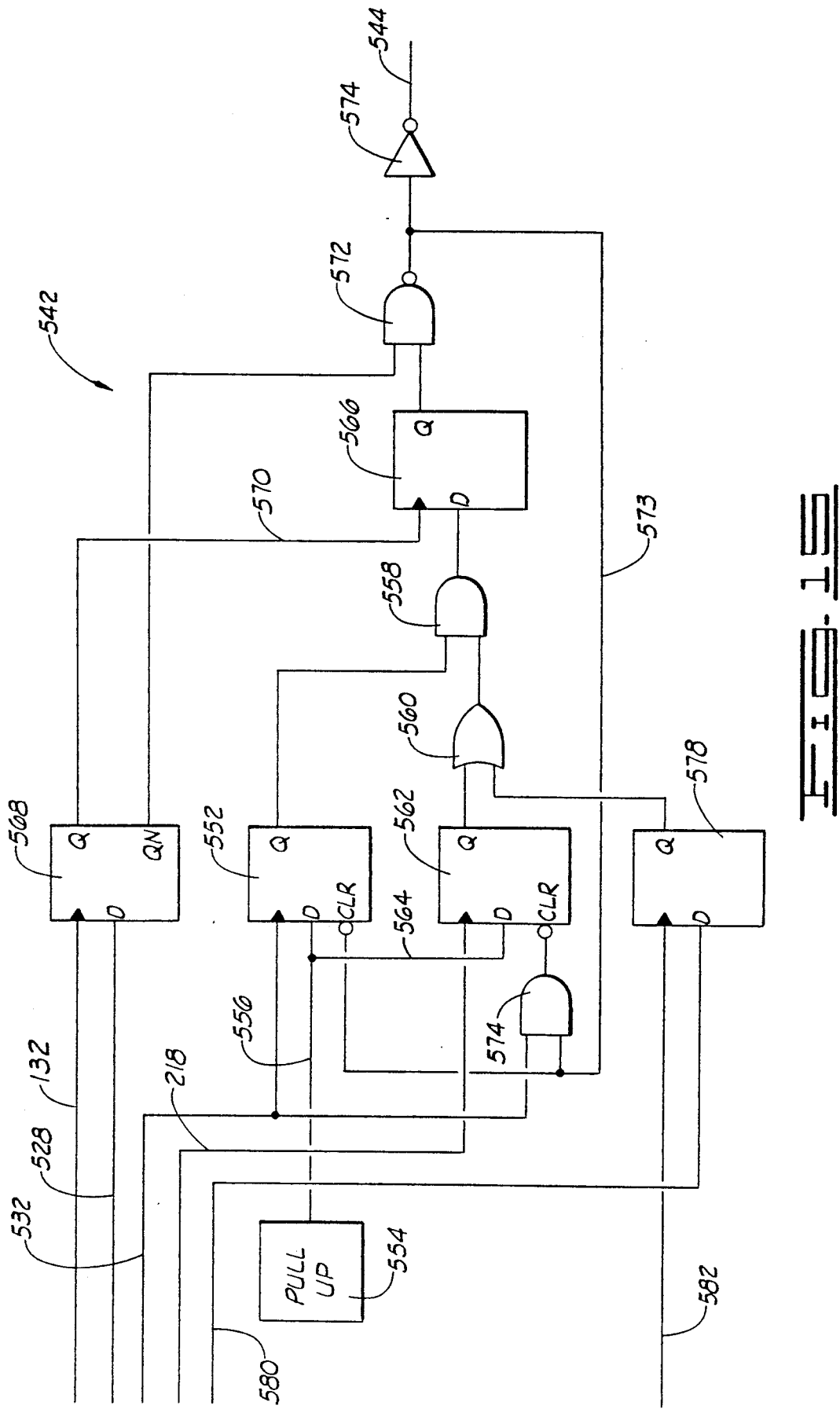

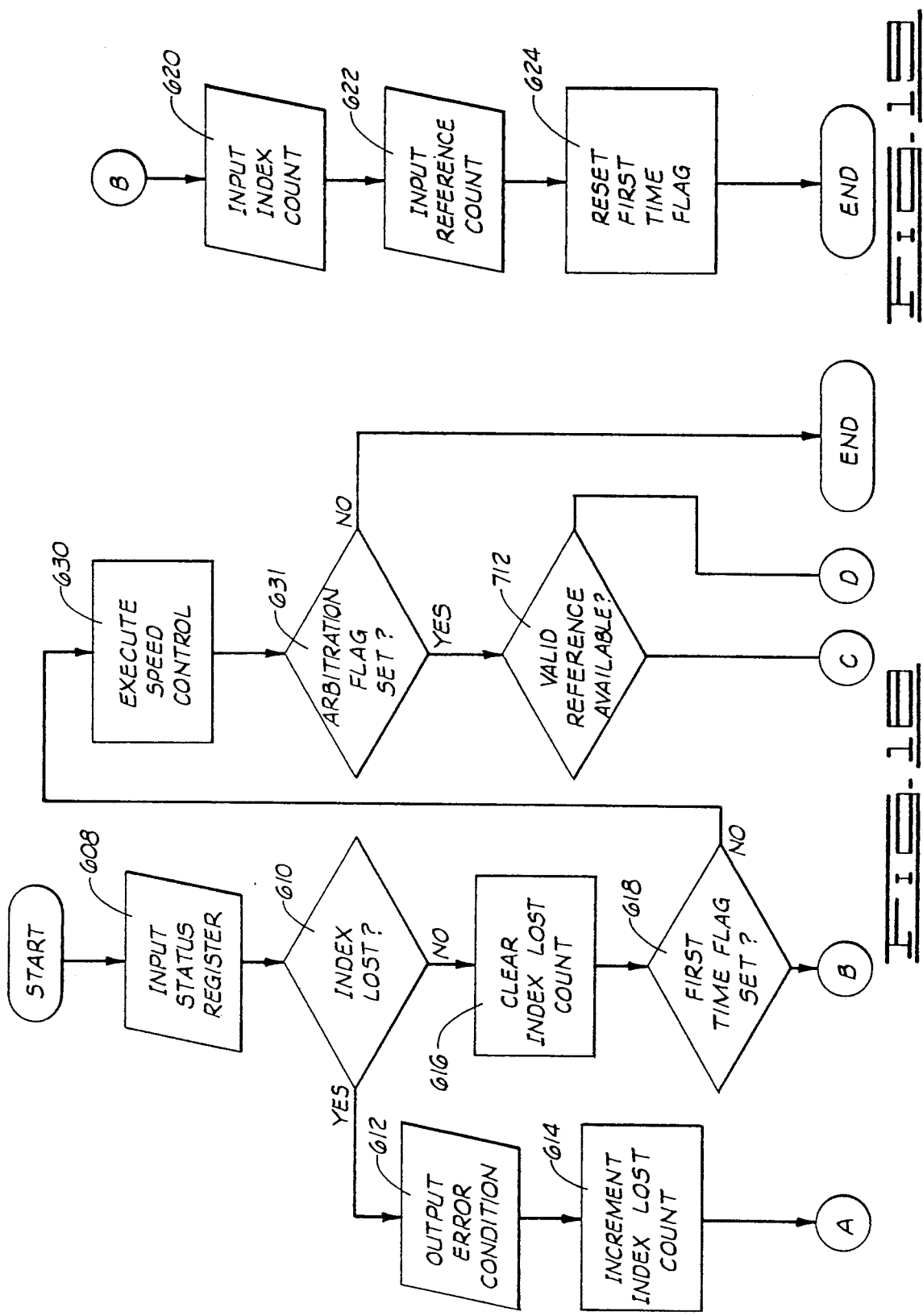

HARD DISC DRIVE FOR USE IN A MULTIPLE DRIVE DATA STORAGE SYSTEM AND METHOD OF OPERATION

BACKGROUND OF THE INVENTION

1. Field of the Invention

The present invention relates generally to improvements in systems for storing computer files, and, more particularly, but not by way of limitation to systems including hard disk drives.

2. Brief Description of the Prior Art

Hard disc drives in which computer files are magnetically stored in surface coatings on rotating metal discs have increasingly become the choice of computer users for long term file storage. The advantages offered by such drives are a large storage capacity coupled with a short file access time. Thus, for example, drives capable of storing over a gigabyte of data with an average access time of the order of 10 milliseconds are now available.

With an ever increasing demand for rapid transfer of files between a host computer and a data storage system the possibility of parallel operation of plurality of hard disc drives, integrated into a single data storage system, has become increasingly attractive. For example, if lenqthy data words were to be divided into a number of bytes and transferred simultaneously between a host computer and an equal number of disc drives, the transfer rate for a file would effectively be multiplied by the number of bytes in the data words. Moreover, the use of a number of disc drives in an integrated system of disc drives. even without parallel operation, offers an economical way of achieving a large file storage capacity with little effect on data storage time.

While the concept of forming a number of hard disc drives into a data storage system is clearly desirable, the practicalities of doing so are another. Thus, where a plurality of disc drives are to be operated in parallel, the cost of carrying out such operation has been a drawback. For parallel operation to be feasible, the rotation of discs of the drives in the system must be synchronized so that each disc of each drive must pas through an orientation constituting an index for the reading and writing of files at the same time. While this synchronization can be achieved by providing the disc drives with appropriately programmed microcomputers, or complex custom circuits, dedicated to the task of controlling and synchronizing the operation of motors which rotate the discs, such approach increases costs of manufacture.

While the direct costs of using microcomputers dedicated solely to the task of motor speed operation or complex custom circuits for the same purpose, there are also hidden costs. As will be clear from the above, synchronization necessarily entails controlling the speeds of the motors of the disc drives of a data storage system in a phase mode of operation; that is, controlling the speeds to cause passage of the discs through the "index" orientation at a specific time. At times, phase control is neither necessary nor desirable; for example, in a lap top computer in which a disc drive will be subjected to rapid physical movements, it is preferable to operate the single disc drive to which the computer is limited by space considerations in the more robust frequency mode in which motor speed control is directed solely toward maintaining a constant disc rotation speed. Thus, unless a parallel capability can be inexpensively achieved, it would not be realistic to provide a single disc drive with both phase and frequency modes of operation. Thus, additional costs can be incurred in the separate design and manufacture of drives used for different purposes.

SUMMARY OF THE INVENTION

The present invention provides a hard disc drive and method of operation which minimizes construction costs in achieving synchronous operation of a plurality of disc drives while permitting asynchronous operation for applications in which robustness is of greater concern than synchronization of the hard disc drive with other drives. To this end, the hard disc drive of the present invention exploits differences in times involved in carrying out control operations in a hard disc drive to limit the circuitry required for selective synchronous or asynchronous operation of a disc drive. As is known in the art, hard disc drives include a servo system, including a servo microcomputer, that is used to radially position transducers on the surfaces of discs of a hard disc drive and such positioning is effected by sampling servo data on at least one disc and generating and transmitting appropriate control signals to the actuator on which the transducers are mounted. Moreover, it is common for the servo system to generate index signals, utilized in controlling the reading and writing of data, that mark a selected orientation of the discs of the drive. In general, the sampling occurs at intervals that are short in comparison to the rotation rate of the discs and, moreover, the servo system spends a great deal of time in an idle loop in which little control is required to maintain the radial locations of the transducers. On the other hand, rotation rate control needs to be effected only once per revolution of the discs and microcomputer time required to generate motor rotation rate control signals is short in comparison to the sampling rate for head location control. Thus, time is available in the servo microcomputer to effect disc rotation rate control without interfering with the major task of the servo microcomputer of effecting control of the position of the transducers.

In one aspect of the invention, a hard disc drive is provided with a motor speed control circuit that comprises a counter that provides counts of time within each of a succession of time intervals equal to a selected period of rotation for the discs of the drive and an index latch circuit for entering the count in the counter each time the servo system generates an index signal indicative of the selected orientation of the disc. Additionally, the hard disc drive of the invention is comprised of an interrupt circuit that receives a signal from the index latch circuit each time a count is entered into the index latch circuit and, in a frequency mode of operation of the interrupt circuit selected by the servo microcomputer in a frequency mode of operation of the motor speed control circuit, generates an interrupt signal that is transmitted to the servo microcomputer for effecting speed control via an interrupt program. More particularly, in the frequency mode of operation, speed control words, indicative of the amplitude of power to be supplied to the motor that rotates the discs, are generated during the interrupt and transmitted to a motor drive circuit which drives the motor. Such control words are determined in relation to the difference in time between successive index signals so that, in the frequency mode of operation, frequency control of the motor is effected to provide robust motor speed control where robustness is a matter of concern to the computer user.

In a second aspect of the invention, the motor speed control circuit is augmented with additional components that enable phase control in which the index signals of a plurality of disc drives are brought into synchronization. To this end, the hard disc drive is provided with a reference latch circuit which similarly enters the count in the counter in response to a signal; in this case, a reference signal, that can be supplied either by the host computer or another disc drive at a reference terminal of the disc drive. In such case, the interrupt circuit is operated in a phase mode, corresponding to a phase/slave mode of operation of the motor speed control circuit, in which the interrupt is generated in response to the entry of both the index and reference counts and control of the motor speed is effected by generating a control word in relation to the difference in times of occurrence of the index and reference signals.

In yet another aspect of the invention, the motor speed control circuit is further comprised of an internal reference generator that receives signals from the timing circuit and generates an internal reference signal at intervals equal to the selected period of rotation of the discs and provides, in a phase/master mode of operation of the motor speed control circuit, the internal reference signal to the reference terminal to provide a reference for a plurality of hard disc drives forming an integrated data storage system. In the phase/master mode of operation, selected by the servo microcomputer, the internal reference signal is utilized to enter counts from the counter into the reference latch circuit and the interrupt circuit is again placed in the phase mode so that interrupts occur in response to entry of counts into both latch circuits. As in the phase/slave mode of operation of the motor speed control circuit, motor speed control words are generated in relation to the time difference between index and reference signals so that phase control enabling synchronization of a plurality of disc drives is again effected.

In a further aspect of the invention, the hard disc drive is provided with a status register that detects both the current state of the reference terminal and the prior appearance of a reference signal on the reference terminal and the servo microcomputer is programmed to place the motor speed control circuit in the phase/slave mode of operation at such times that a reference signal has occurred prior to an interrupt of the servo microcomputer. In the absence of such an occurrence, the motor speed control circuit is placed in the phase/master mode of operation so that the disc drives of an integrated data storage system will automatically select one drive of the system as the master drive and the remaining drives as slaves for synchronous operation of the system. Thus, no additional programming of a host computer is required to effect the synchronous operation.

An object of the present invention is to decrease the time required for storage and retrieval of computer files by providing a hard disc drive that can be synchronously operated with other hard disc drives in a data storage system.

Another object of the present invention is to provide flexibility in the operation of hard disc drives permitting one drive to be used in plural applications.

A further object of the invention is to provide such flexibility without materially increasing the expense of manufacture of hard disc drives.

Yet another object of the invention is to increase the capacity of data storage systems without materially affecting data access time.

Still another object of the invention is to provide a data storage system that combines large capacity with facility in the use of the system by a host computer.

Another object of the invention is to minimize the cost of data storage systems having a large capacity and a minimal data access time.

Other objects, features and advantages of the present invention will become apparent from the following detailed description when read in conjunction with the drawings and appended claims.

BRIEF DESCRIPTION OF THE DRAWINGS

FIGS. 3A and 3B are a schematic circuit diagram of the motor speed control circuit of FIG. 2.

FIG. 4 is a schematic circuit diagram of the clock circuit of FIG. 3A.

FIG. 5 is a schematic circuit diagram of the timing circuit of FIG. 3A.

FIG. 6 is a schematic circuit diagram of the index latch circuit of FIG. 5.

FIG. 7 is a timing diagram illustrating the operation of the index latch circuit.

FIG. 8 is a schematic circuit diagram of the internal reference generator of FIG. 3A.

FIGS. 12A and 12B are a schematic circuit diagram of the interrupt circuit of FIG. 3B.

FIG. 14 is a schematic circuit diagram of the motor drive circuit of FIG. 3B.

FIG. 16 is a flow chart of the main program of the servo microcomputer.

FIG. 18 is a flow chart corresponding to the frequency mode of operation of the motor speed control circuit.

FIG. 19 is a flow chart of a data load routine used in all modes of operation of the motor speed control circuit.

DESCRIPTION OF THE PREFERRED EMBODIMENT

Figure 1:
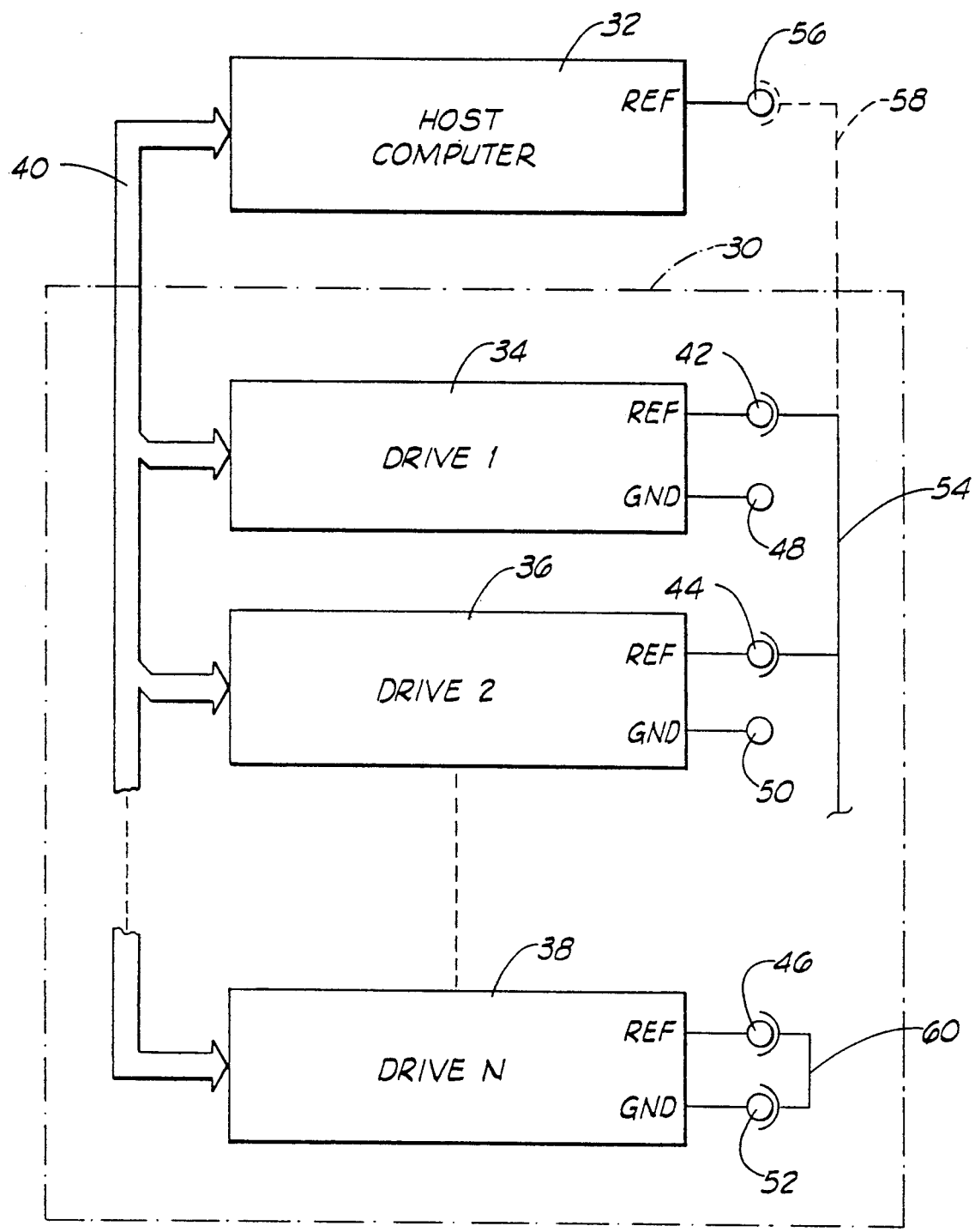
FIG. 1 is a schematic representation of a data storage system constructed in accordance with the present invention.

Referring now to the drawings in general and to FIG. 1 in particular, shown therein and designated by the general reference number 30 is a data storage system constructed in accordance with the present invention to store files from a host computer 32. As shown in FIG. 1, the data storage system 30 is comprised of a plurality of hard disc drives, three of which have been illustrated and designated by the reference numerals 34, 36 and 38, which are connected to the host computer 32 via a bus 40.

As is conventional, the bus 40 provides a conduit for transferring data between the host computer 32 and the drives 34, 36 and 38 and, further, provides electrical power and control signals from the host computer 32 to the drives 34, 36 and 38 so that any drive may, by appropriate programming of the host computer 32, be selected to store any file that the host computer may generate or programs that might be entered into the host computer from an external source. In the practice of the invention, the drives 34, 36 and 38 are provided with reference terminals, 42, 44 and 46 respectively, and, further, the drives 34, 36 and 38 are provided with factory accessible, internally grounded ground terminals, 48, 50 and 52 respectively, for a purpose to be described below. In use of the data storage system 30, the reference terminals of any or all of the drives 34, 36 and 38 may be interconnected by a jumper cable as shown by the interconnection of the reference terminals 42 and 44 by the jumper 54 in FIG. 1. It is further contemplated that the host computer 32 may be provided with a reference terminal 56 and, in such case, the jumper 54 may be connected to the host computer reference terminal 56 as indicated in dashed line at 58 in FIG. 1. Alternatively, the reference terminal of one or more of the drives may be grounded as indicated by the jumper 60 connected between the terminals 46 and 52 of drive 38. The purpose of such connections will be discussed below.

Figure 2:
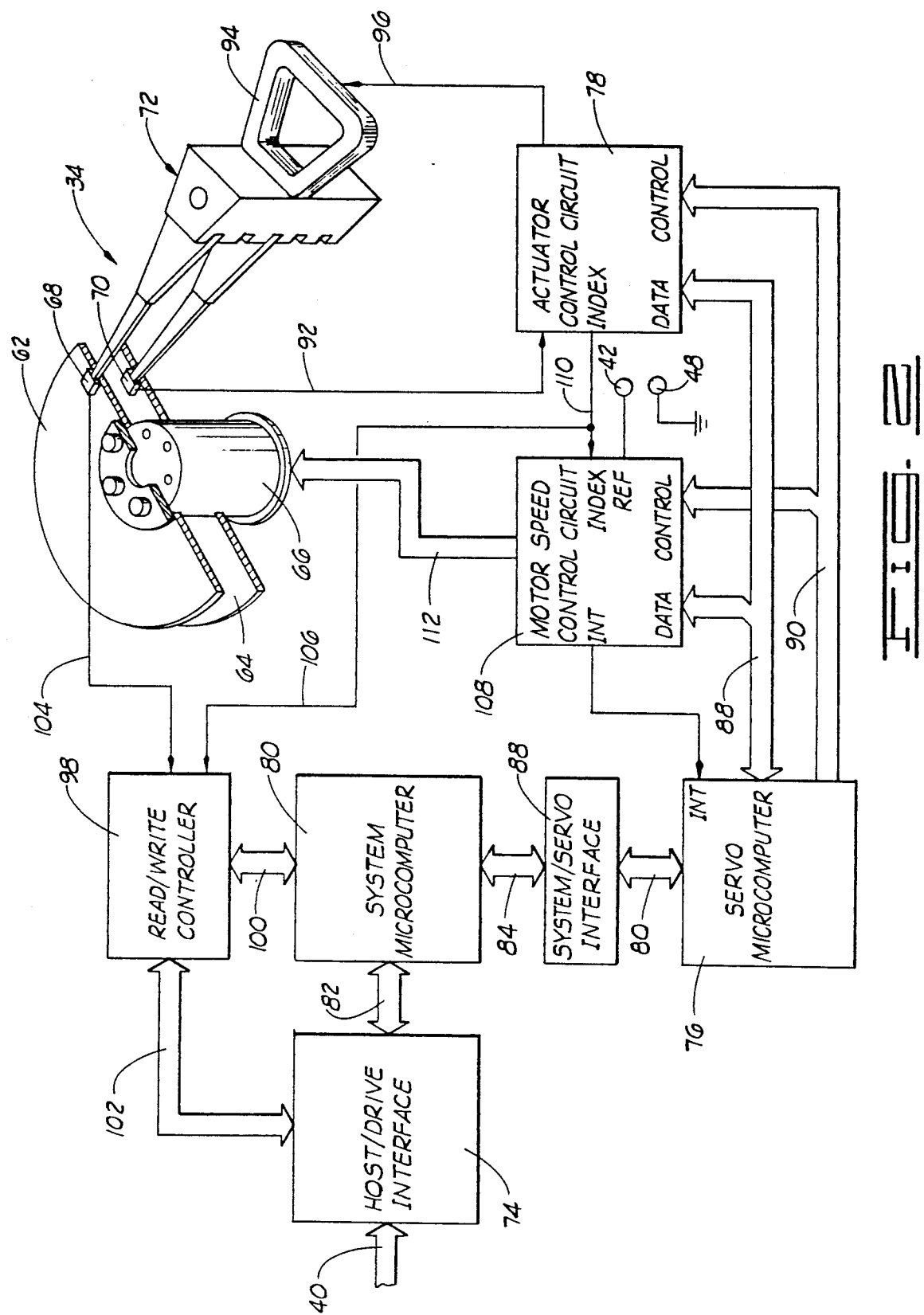
FIG. 2 is a schematic representation of a hard disc drive of the data storage system of FIG. 1.

The drives 34, 36 and 38 are constructed identically and such construction has been illustrated for the drive 34 in FIGS. 2 through 15. As shown in FIG. 2, the drive 34 is generally comprised of a plurality of discs, two of which are illustrated at 62 and 64, mounted on the rotor of a polyphase electric motor 66 for rotation of the discs 62, 64 about a common axis. As is conventional, the discs 62, 64 have magnetizable surface coatings and transducers, such as the transducers 68 and 70 shown in FIG. 2, are supported adjacent the surfaces of the discs 62, 64 by an electromechanical actuator 72 that can be pivoted to move the transducers 68, 70 radially across the surfaces of the discs 62, 64.

In operation, files to be stored on a disc are written to concentric data tracks (not shown) defined on the disc surfaces in the form of strings of magnetized cells and any file may be accessed via appropriate instructions received by the drive 34 at a host/drive interface 76 to which the bus 40 extends. To this end, servo data is conventionally written to at least one disc to be read by a transducer and the drive 34 is conventionally comprised of a servo system (not generally designated in the drawings) that is, in turn, comprised of a servo microcomputer 76 and a conventional actuator control circuit 78. (For purposes of illustration, it will be assumed herein that the servo system is of the type in which one surface of one disc, the disc 64 in FIG. 2, is a dedicated servo surface and the transducer, 70 in FIG. 2, is a servo transducer that reads a servo pattern on the dedicated servo surface. However, it will be clear to those of skill in the art that no limitation of the scope of the present invention is to be implied from such assumption.) While the servo system is conventional, it will be useful to briefly describe its operation in the storage or recovery of files to provide a basis for describing the hard disc drive of the present invention.

Instructions to store or read files are transmitted to a system microcomputer 80 via a bus 82 from the host/drive interface 74 and the system microcomputer 80 transmits instructions, via buses 84 and 86 and a system/servo interface 88, indicating the storage location to the servo microcomputer 76. The servo microcomputer 76 translates these instructions into digitally encoded electrical signals for the movement of the actuator 72 and transmits these signals to the actuator control circuit 78, via a data bus 88, along with control signals, on a control bus 90, for entry of the control signals into latches of the actuator control circuit 78. In response, the actuator control circuit 78, which receives signals indicative of the location of the transducer 70 with respect to the servo pattern on the upper surface of disc 64 via a conducting path 92, operates in a track seeking mode to pass a current through a coil 94 on the actuator 72, via a conducting path 96, to give rise to a pivoting force on the actuator 72. (As is known in the art, the coil 94 is immersed in a magnetic field provided by a magnet assembly, not shown, so that the force on the actuator 72 arises in accordance with the well-known Lorentz relation.) Once the actuator 72 has been pivoted to a position that will radially align the transducers 68, 70 with selected tracks on the discs 62 and 64, the actuator control circuit 78 operates in a track following mode to pass a current through the coil 94 that will maintain the radial alignment.

Once the transducers 68 and 70 are appropriately positioned, a file can be stored or recovered via a read/write controller 9 that operates under the control of the system microcomputer 80, via control signals received on a bus 100. More specifically, parallel data to be stored to a disc is received by the read/write controller 98 from the host/drive interface 74 on a bus 102, serialized, and written to the selected disc surface as a series of current reversals transmitted to a selected transducer; for example, the transducer 68, via a conducting path 104. Reading of data is effected by utilizing the transducer 68 to detect magnetic reversals on the disc surface associated with the transducer 68, to obtain a serial stream of pulses indicative of the content of the stored data, converting the stream to a parallel representation of the data and returning the data to the host/drive interface 74 via the bus 102 whence it is returned to the host computer.

As is known in the art, data is stored in sectors which are numbered from an index defined on the discs by the servo pattern; for example, as disclosed in U.S. Pat. No. 4,864,434 issued Sep. 5, 1989 to Janz, and the actuator control circuit 78 is constructed to provide an index signal, indicative of passage of portions of the servo pattern defining the index by the servo transducer 70, to the read/write controller 98, via conducting path 106, for coordination of the timing of data transfer operations and disc orientation. Thus, each revolution of the discs 62, 64 is marked by an index signal and, further, each index signal corresponds to a specific orientation of the discs 62, 64 within the hard disc drive 34. In the present invention, the index signals are used in controlling the rotational speed of the motor as will be described below.

In the practice of the invention, the speed of rotation of the rotor of the motor 66 is controlled by a novel motor speed control circuit 108 that operates, in a plurality of selectable modes, in response to signals received from the servo microcomputer 76 on the data bus 88 and the control bus 90, signals received at the reference terminal 42, and the index signal from the actuator control circuit 78, received on a conducting path 110, to provide electrical power at a controlled amplitude to the motor 66 via a bus 112. Circuit diagrams for the motor speed control circuit 108 have been presented in FIGS. 3 through 15 and flow charts illustrating the programming of the servo microcomputer to effect motor speed control via the motor speed control circuit have been presented in FIGS. 16 through 23 below.

Figure 9:
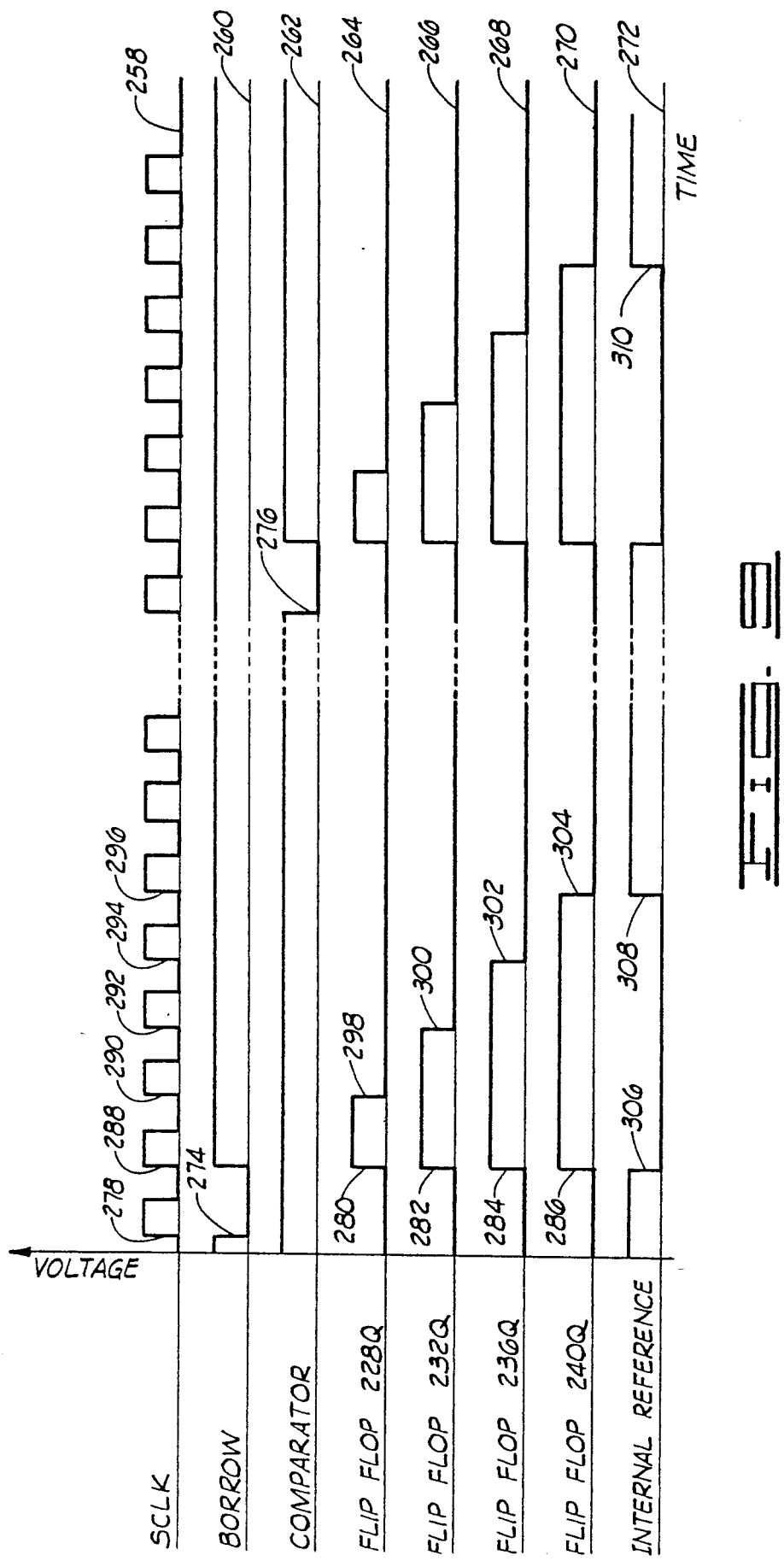
FIG. 9 is a timing diagram illustrating the operation of the internal reference generator.
Figure 10:
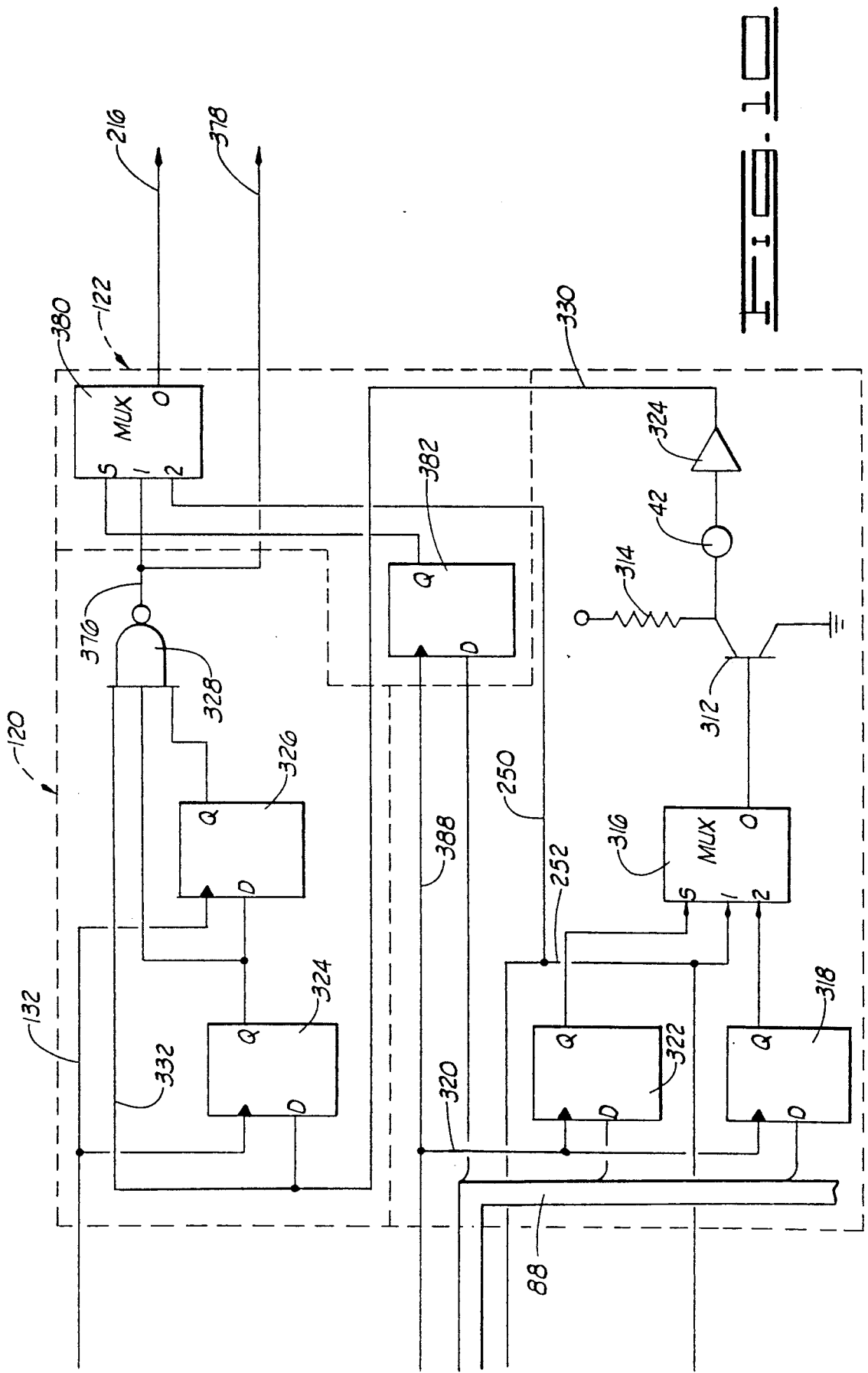
FIG. 10 is a schematic circuit diagram of the reference terminal interface and reference selector of FIG. 3A.
Figure 11:
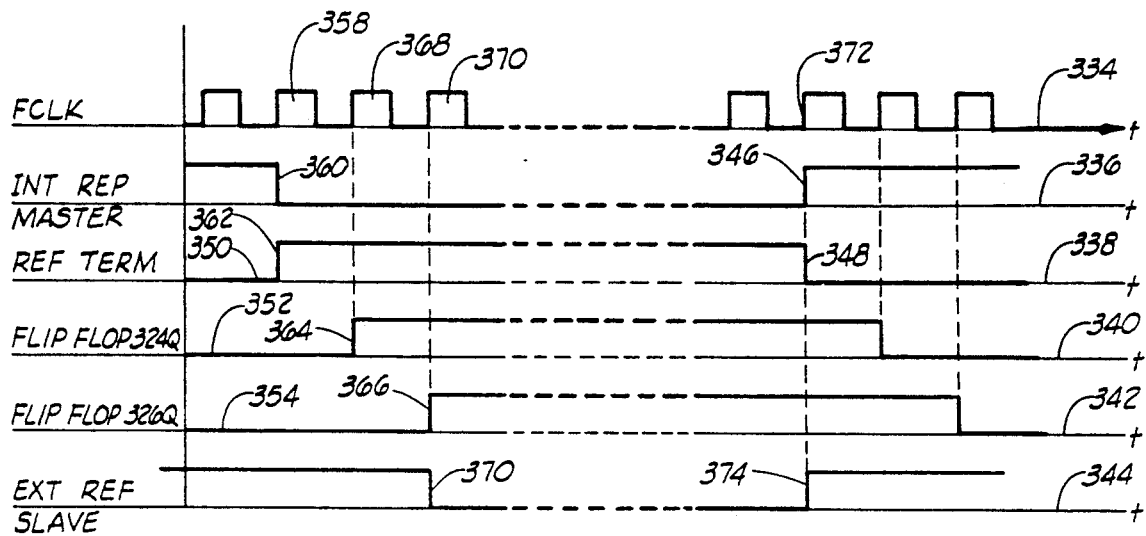
FIG. 11 is a timing diagram illustrating the generation of an external reference by the reference terminal interface.
Figure 13:
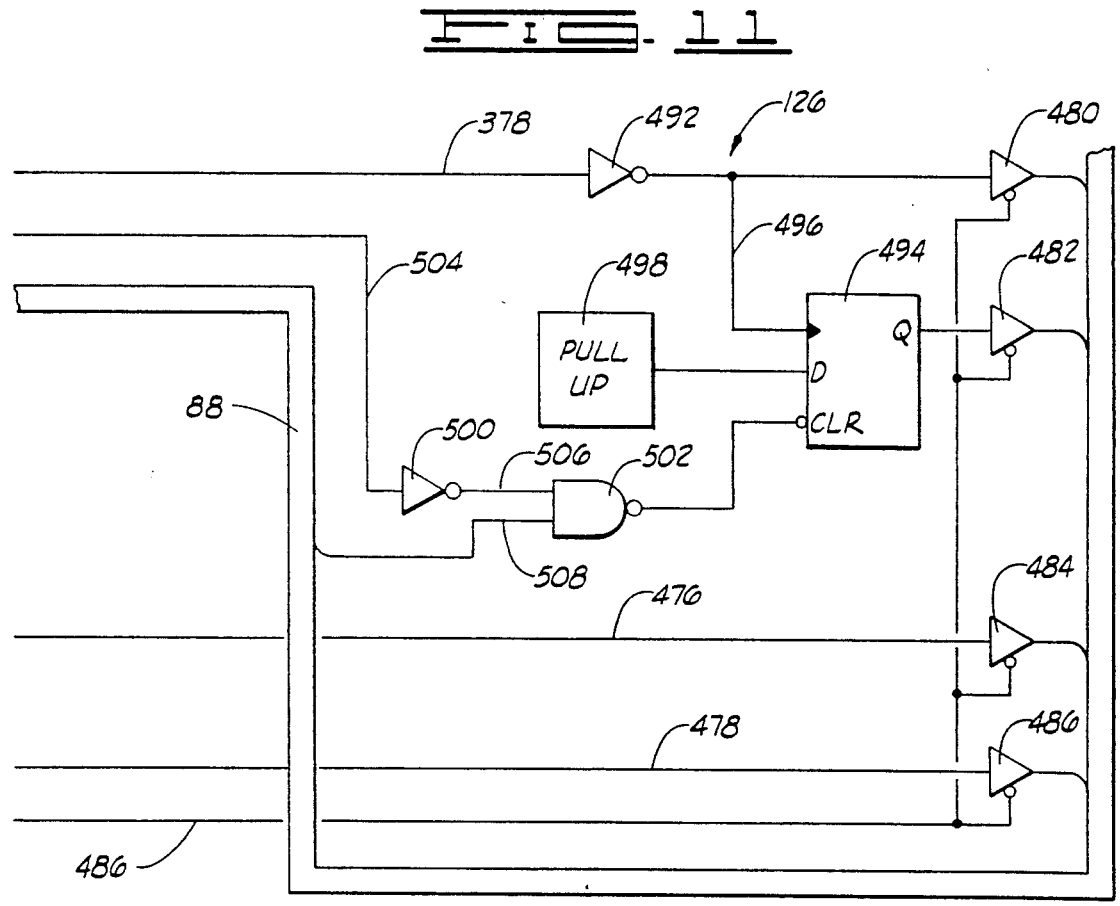
FIG. 13 is a schematic circuit diagram of the status register of FIG. 3B.
Figure 12B:
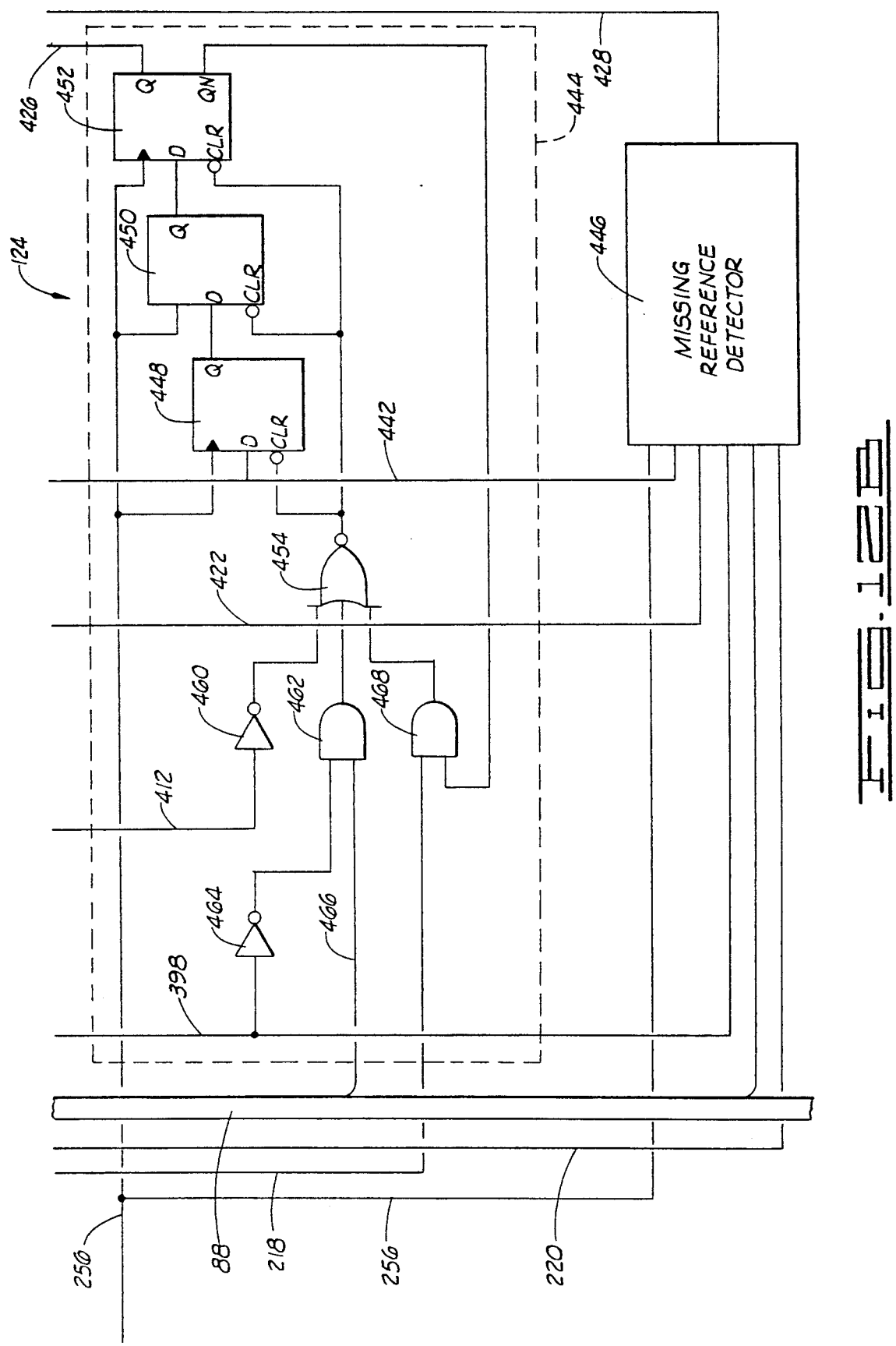
Figure 15:
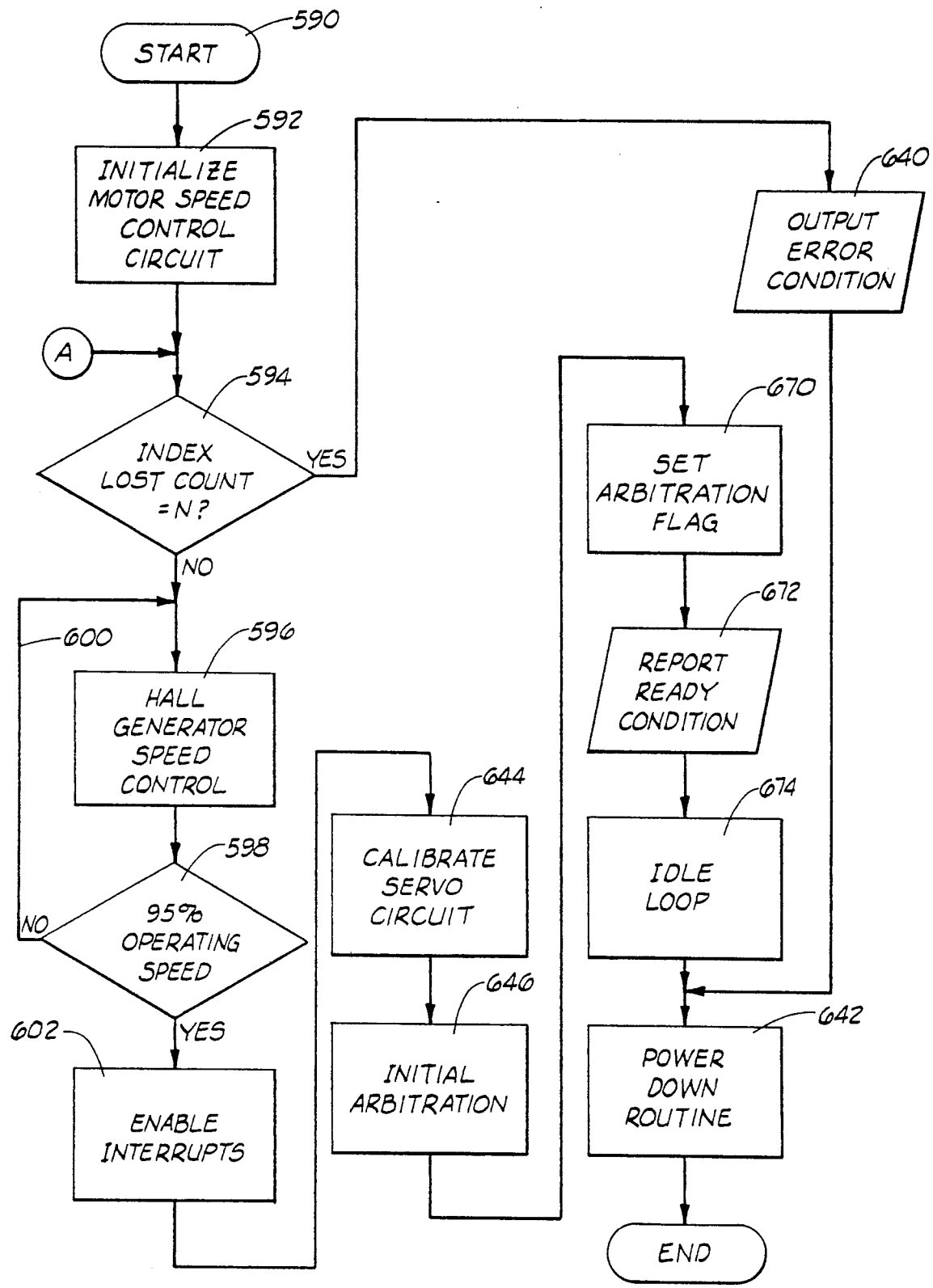
FIG. 15 is a schematic diagram of the control word transfer circuit of FIG. 14.

Referring first to FIGS. 3A and 3B, the motor speed control circuit 108 is generally comprised of:

- a clock circuit 114, more particularly illustrated in FIG. 4, which generates clock signals utilized in other components of the motor speed control circuit 108 (for clarity of illustration, connections between the clock circuit 114 and the remaining components of the motor speed control circuit 108 have not been shown in FIGS. 3A and 3B);
- a timing circuit 116, more particularly illustrated in FIGS. 5 through 7, which generates information indicative of successive times that index signals are received by the motor speed control circuit 108 and times of reception or generation of reference signals utilized in the synchronous operation of a plurality of hard disc drives within the data storage system 30;
- an internal reference generator 118, more particularly illustrated in FIGS. 8 and 9, that generates reference signals at time intervals equal to a selected period of rotation of the discs 62, 64;
- a reference terminal interface 120, more particularly illustrated in FIGS. 10 and 11, which transmits internal reference signals to the reference terminal 42 and receives external reference signals therefrom;
- a reference selector 122, more particularly illustrated in FIG. 10, that selects an internal or external reference signal for control of the rotation speed of the motor 66 in phase/master and phase/slave modes of operation of the motor speed control circuit 108;
- an interrupt circuit 124, more particularly illustrated in FIGS. 12A and 12B, that interrupts the servo microcomputer 76 when timing information for motor speed control has become available in the timing circuit 116;
- a status register 126, more particularly illustrated in FIG. 13, that provides information relating to present and previous states of the reference terminal 42 to the servo microcomputer 76; and
- a motor drive circuit 128, more particularly illustrated in FIGS. 14 and 15, that receives motor speed control words from the servo microcomputer 76 and provides electrical power to the motor 66 in relation to the control word.

These circuits will now be described in turn.

The Clock Circuit

Referring now to FIG. 4, the clock circuit 114 is comprised of a crystal oscillator 130 that provides clock signals, referred to herein as a fast clock, on a conducting path 132 that is utilized for clocking the servo microcomputer 76 as well as selected ones of the components of the motor speed control circuit 108 as will be discussed below. Additionally, the clock circuit is comprised of divide-by-8, divide-by-16 and divide-by-32 circuits, 134, 136 and 138 respectively, that are used to provide a slow clock on a conducting path 140 and an auxiliary clock on a conducting path 142 for purposes that will be discussed below. For the present, it will be noted that the auxiliary clock can be selected to be the output of the divide-by-8 circuit 134 or the divide-by-16 circuit 136 while the slow clock can be selected to be the output of the divide-by-16 circuit 136 or the divide-by-32 circuit 138. Such selections are effected by: a mux 144, whose inputs receive the outputs of the divide-by-8 and divide-by-16 circuits and whose output provides the auxiliary clock; a mux 146, whose inputs receive the outputs of the divide-16 and divide-by-32 circuits and whose output provides the slow clock; and a type D flip flop 148 having a Q output connected to the select terminals of the muxes 144 and 146. The clock terminal of the flip flop 148 receives a control signal on a conducting path 150 (See also FIG. 3A) connected to the control bus 90 of the servo microcomputer 76 and the D input of the flip flop is connected to the data bus 88, via a conducting path 152, so that the selection of the frequencies of the slow and auxiliary clocks can be effected by outputting an appropriate selection bit from the microcomputer 76 to the flip flop 148. (As is conventional, the flip flop 148, as well as other flip flops to be described below, has a clear terminal that is connected to a hardware reset circuit that resets the flip flop 148 during power up of the hard disc drive 34. For clarity of illustration, the reset circuit and the clear terminals of the flip flops, except as required to describe the motor speed control circuit 108, have not been shown in the drawings.) The presence of the selection feature for the slow and auxiliary clocks enables the motor speed control circuit 108 to be operated with servo microprocessors having different clocking requirements without need for adjusting clocking requirements of components of the motor speed control circuit 108.

The Timing Circuit

Referring to FIG. 5, the timing circuit 116 is comprised of a down counter 154 that is continuously clocked by the slow clock, as indicated by the designation of the conducting path to the clock terminal of the counter 154 by the numeral 140, and index and latch circuits, 156 and 158 respectively, that are electrically connected to the count terminals of the counter 154, via buses 160 and 162 respectively, so that the contents of the counter 154 can be entered into the latch circuits 156 and 158 as will be discussed below. Additionally, all but the most significant bit of the counter contents are provided to the internal reference generator 118, via a bus 164, for a purpose also to be discussed below. (Such bits will be referred to herein as the N−1 least significant bits of the count in the counter 154.)

The down counter 154 is of the type that can be preset to a selected count received on a bus 166 in response to the trailing edge of a negative voltage pulse received at a load terminal of the counter 154. Such pulse is supplied from a normally high borrow terminal of the counter 154 via a conducting path 168 so that, during operation of the motor speed control circuit 108, the counter 154 will repetitively count down from the selected count received on bus 166. Such count is provided by a revolution time latch 170 whose contents are entered from the servo microprocessor via the data bus 88 in response to a write enable signal provided on a conducting path 172 connected to the control bus 90. In the preferred practice of the invention, the time entered into the latch 170 is twice the time, in slow clock periods, for one revolution of the discs 62, 64 so that the counter 154 will repetitively count time intervals that are equal to the desired rotation time for the discs 62 and 64 (the N−1 least significant bits of the counter contents) and provide an additional bit, the most significant bit in the counter contents, that indicates which of two cycles of such counts are present in the counter 154. (The counting of two disc revolutions for each reload of the counter simplifies programming for calculations that will be described below.) All but the least significant bit, referred to herein as the N−1 most significant bits, of the latch contents are transmitted to the internal reference generator 118 on a bus 174 and the signal from the borrow terminal used to reload the counter 154 is provided to the internal reference generator 118 on a conducting path 176 for a purpose to be discussed below.

The construction of the index latch circuit 156 has been illustrated in FIG. 6 to which attention is now invited. As shown therein, the index latch circuit 116 is comprised of a latch 178 that loads the contents of the counter 154, received by the latch 178 via the bus 160, in response to an index latch signal received at a load terminal of the latch 178. Output terminals of the latch 178 are connected to the data bus 88 of the servo microcomputer 76 so that such contents can be read into the servo microcomputer 76 via a read enable signal transmitted to an enable terminal of the latch 178 via the control bus 90 and a conducting path 180.

The contents of the counter 154 are transferred to the latch 178 each time an index signal is received on conducting path 110 by the motor speed control circuit 108 as will now be described with additional reference to FIG. 7. As shown in FIG. 6, the index latch circuit 116 is comprised of a type D flip flop 182 having a clock terminal that receives the index signal on the conducting path 110 and a D input terminal that is connected to a pull up 184. Thus, as shown on the graphs 186 and 188 in FIG. 7, whereon are plotted voltage levels for the index signal and the state of the Q output of the flip flop 182, respectively, with time, the Q output of the flip flop 182 will rise each time a leading edge of an index pulse occurs, as shown by the edges 190 and 192 on the plots 186 and 188 respectively. The Q output of the flip flop 182 is connected to the D input of a type D flip flop 194 that is clocked by slow clock pulses appearing on conducting path 140 that has been carried into FIG. 6 from FIG. 4. Thus, with the rise of the first slow clock pulse following the rise of the index signal, the Q output of flip flop 194 will rise as shown by the graphs 196 and 198 in FIG. 7, whereon are plotted voltage levels for the slow clock and the flip flop 194 Q output as functions of time. Specifically, with the leading edge 200 of the slow clock pulse immediately following the rising edge 190 of the index pulse, the Q output of the flip flop 194 will undergo a rise indicated at 202 on the graph 198. The Q output of the flip flop 194 is similarly connected to the D input terminal of a type D flip flop 204 whose Q output provides the index latch signal to the latch 178. The flip flop 204 is continuously clocked by the auxiliary clock, as indicated by the conducting path 142 that has been carried into FIG. 6 from FIG. 4, so that, as indicated by the graph 196 and the graphs 206 and 208 in FIG. 7, whereon are plotted the auxiliary clock pulses and the index latch signal respectively, the contents of the counter 154 are entered into the latch 178 with the immediately ensuing falling edge 210 of the slow clock; that is, with the rising edge 212 of the index latch signal that occurs in response to the rising edge 214 of the auxiliary clock pulse immediately following the slow clock pulse edge 200. The QN output terminal of the flip flop 204 is connected to an inverting clear terminal of the flip flop 182 so that, as the index latch signal rises, the voltage at the Q output terminal of the flip flop 182 falls. As indicated by the graphs 198 and 208, this voltage drop is clocked through the flip flops 194 and 204 to reset the index latch circuit 116 for the next index pulse to be received by the motor speed control circuit 108 from the actuator control circuit 78.

The reference latch circuit 158 is constructed identically to the index latch circuit 156 and enters the count in the counter 154 in an identical manner in response to the rising edge of a reference signal provided, as will be discussed below, on a conducting path 216 from the reference selector 122. More specifically, the reference latch circuit is comprised of a latch (not shown) that enters the counter contents in response to a reference latch signal that is completely analogous to the index latch signal by means of which the counter contents are entered into the latch 178. The index and reference latch signals are provided to other components of the motor speed control circuit 108 on conducting paths 218 (FIGS. 3, 5 and 6) and 220 (FIGS. 3 and 5) for purposes to be described below.

The Internal Reference Generator

The structure of the internal reference generator has been illustrated in FIG. 8 and the operation of such generator has been graphically illustrated in FIG. 9. Referring first to FIG. 8, the internal reference generator is comprised of a comparator 222 which receives the N−1 least significant bits in the counter 154 at an A input while receiving the N−1 most significant bits of the revolution time latch 170 at a B input as indicated by the buses 164 and 174 which have been carried into FIG. 8 from FIGS. 3 and 5. The comparator 222 is of the type that provides a high voltage level at an A=B terminal at all times other than when the digitally expressed words at the A and B inputs are the same and a low voltage level at the A=B terminal at such times that the words at the A and B inputs are the same. The voltage level at the A=B terminal is transmitted to one input of a NAND gate 224 via a conducting path 226, the other input of which receives the counter borrow signal via the conducting path 176.

The output of the NAND gate 224 is connected to the D input of a type D flip flop 228, via conducting paths 227 and 229, having a Q output connected to one input of an OR gate 230. The output of the OR gate 230 is connected to the D input of a type D flip flop 232 having a Q output connected to one input of a second OR gate 234; the output of the OR gate 234 is connected to the D input of a type D flip flop 236 having a Q output connected to one input of an OR gate 238 whose output is connected to the D input of a type D flip flop 240. The second inputs of the OR gates 230, 234 and 238 are connected to output of the NAND gate 224 via the conducting paths 227 and 229 and conducting paths 242, 244 and 246 for the gates 230, 232 and 238 respectively. All four of the flip flops 228, 232, 236 and 240 are clocked by the slow clock as indicated by the continuation of the conducting path 140 of FIG. 4 into FIG. 8. The Q output of the flip flop 240 is connected to the input of an inverter 248 whose output provides an internal reference signal on signal paths 250, 252, and 256 (See FIG. 3) to the reference selector 122, the reference terminal interface 120, and the interrupt circuit 124 respectively. The operation of the internal reference generator 118 is graphically shown in FIG. 9 to which attention is now invited.

In FIG. 9, the slow clock pulses, the voltage level at the counter borrow terminal, the comparator 222 output, the voltage levels at the Q outputs of flip flops 228, 232, 236 and 240, and the reference signal have been graphically illustrated as functions of time on plots 258, 260, 262, 264, 268, 270 and 272 respectively. As will be clear from the above description of the counter 154, the borrow terminal of the counter 154 will be normally high, generating a negative pulse each time the count in the counter reaches zero; that is, at the end of each of a sequence of time intervals equal to two periods of revolution selected for the discs 62, 64. Similarly, from the above described connection of the revolution time latch 170 and the counter 154 to the comparator 222, the comparator 222 will generate a negative pulse at such times that the count in the counter 154 is half the count entered into the revolution time latch 170; that is, again at the end of each of a sequence of time intervals equal to two periods of revolution selected for the discs 62, 64. Moreover, the negative pulses generated by the counter borrow will be offset by one disc revolution period from the negative pulses generated by the comparator 222. As a result, the output of the NAND gate 224 will be normally low but will rise for one slow clock period at intervals equal to one period of revolution selected for the discs 62, 64. More particularly, the output of the NAND gate 224 will rise for each negative pulse provided by the counter borrow, one of which has been indicated at 274 on the graph 260 of FIG. 9, and for each negative pulse provided by the comparator 222, one of which has been indicated at 276 in FIG. 9. In either case, a high voltage level will be placed on the D input of the flip flop 228 via the direct connection of the output of the NAND gate 224 to the flip flop 228 and high voltage levels will be placed on the D inputs of the flip flops 232, 236 and 240 via the OR gates 230, 234 and 238. More specifically, the slow clock pulse, indicated at 278, that gives rise to the negative pulse 274 from the counter borrow terminal will give rise to high voltage levels on the inputs of the flip flops 228, 232, 236 and 234 so that the Q outputs of the flip flops will be clocked high, as shown at 280, 282, 284 and 286, with the rise of the succeeding slow clock pulse 288. At the same time, the borrow output terminal of the counter will go high to drop the voltage level at the output of the NAND gate 224. Accordingly, a low voltage level will be clocked successively into the Q outputs of the flip flops 228, 232, 236 and 240 by succeeding slow clock pulses 290, 292, 294 and 296 as indicated by downgoing edges 298, 300, 302 and 304 on the graphs 264, 266, 268 and 270 respectively. Thus, the internal reference provided by the inverter 248 (the complement of the voltage level at the Q output of flip flop 24) will drop, at 306, as the borrow output of the counter 154 returns high and will rise, at 308, four slow clock periods later. A similar set of events will take place in response to the negative pulse 276 from the comparator 222 so that output of the inverter 248 will exhibit a rising edge 310 at a time equal to the period of revolution selected for the discs 62, 64 following the rising edge 308. Thus, at time intervals equal to the period of revolution selected for the discs 62, 64, a rising edge will appear at the output of the inverter 248. As will be discussed below, in the phase/master mode of operation of the motor speed control circuit 108 in which the internal reference signals appearing at the output of the inverter 248 provide reference signals for synchronization of the indices of all of the drives of a data storage system 30, the motor 66 is driven to cause coincidence of the edges 308 and 310 with rising edges 290 of the index signal received from the actuator control circuit 78.

Reference Terminal Interface

Referring now to FIG. 10, the reference terminal interface 120 is comprised of an npn transistor 312 having a grounded emitter and a collector connected to the reference terminal 42 and, via a resistor 314, to the positive terminal of the disc drive 34 power supply. Thus, by grounding the base of the transistor 312, the reference terminal 42 can be allowed to float to a high voltage level while the transmission of a high voltage level to the base of the transistor 312 will ground the reference terminal 42. The base of the transistor 312 is connected to the output of a mux 316 that receives, at one input thereof, the internal reference signal on the conducting path 250 and, at a second input thereof, the voltage level at the Q output of a type D flip flop 318. The clock terminal of the flip flop 318 is connected, via a conducting path 320, to the control bus 90 of the servo microcomputer 76 and the D input of the flip flop 318 is connected to the servo microcomputer data bus 88 so that a selected voltage level can be transmitted to the second input of the mux 316 by outputting a corresponding data bit to the flip flop 318. The mux 316 is controlled by a type D flip flop 322, the Q output of which is connected to the select terminal of the mux 316. The D input of the flip flop is connected to the data bus 88 and the clock terminal of the flip flop 322 is connected to the control bus 90 via the conductor 320 so that the mux 316 can be caused to selectively transmit the voltage level at the Q output of the flip flop 318 to the base of the transistor 312 or to transmit the internal reference signal generated in the disc drive 34 to the base of transistor 312.

As will be discussed below, the disc drive 34 can be operated in the phase/slave mode in which the motor speed is controlled in relation to an external reference signal received from one of the other disc drives of the data storage system 30 or from the host computer 32. In such mode of operation the data bit entered into the flip flop 322 will be selected to transmit the voltage level at the Q output of the flip flop 318 to the base of transistor 312 and the data bit entered into the flip flop 318 will be selected to cause the Q output thereof to be low. Thus, in the phase/slave mode of operation of the disc drive 34, the base of the transistor 312 will be grounded to permit another disc drive or the host computer 32 to control the voltage state of the reference terminal 42.

In the phase/master mode of operation of the disc drive 34, in which motor speed control for all disc drives of the data storage system 30 is effected in relation to the internal reference signal generated in the disc drive 34, the flip flop 322 and mux 316 pass the internal reference signal generated in the disc drive 34 to the reference terminal. Thus, in the phase/master mode of operation, the base of the transistor will be high, to ground the reference terminal 42 at all times other than the four slow clock periods during which the negative internal reference pulse is generated as described above with respect to FIGS. 8 and 9. More particularly, the voltage state at the reference terminal 42 will undergo a sharp drop, corresponding to the rising edges 308 and 310 in FIG. 9, once per time interval equal to the desired period of revolution of the discs 62 and 64.

For operation of the disc drive 34 in the phase/slave mode, the reference terminal interface 120 is further constructed to generate an external reference signal in response to the presence of a reference signal from another disc drive or the host computer on the reference terminal 42. To this end, the reference terminal 42 is connected to the input of a schmitt trigger 324 having an output connected to a deglitcher (not generally numbered in the drawings) comprised of type D flip flops 324 and 326 and a three input NAND gate 328. Specifically, the output of the schmitt trigger 324 is connected the D input of the flip flop 324 via a conducting path 330 and to one input of the NAND gate 328 via the conducting path 330 and a conducting path 332. The Q output of the flip flop 324 is connected to a second input of the NAND gate 328 and to the D input of the flip flop 326 and the Q output of the flip flop 326 is connected to the third input of the NAND gate 328. The clock terminals of both flip flops 324 and 326 receive the fast clock signals generated in the clock circuit 114 on the conducting path 132 that has been carried into FIG. 10 from FIG. 4.

The operation of the deglitcher to generate an external reference signal for the disc drive 34, as well as any other slave disc drive, has been graphically illustrated in FIG. 11 in which are presented plots, as functions of time of: the fast clock signals (graph 334); the internal reference signal generated by a master disc drive connected to the reference terminal 42 (graph 336); the voltage state of the reference terminal 42 (graph 338) of a slave disc drive; the voltage level at the Q output of the flip flop 324 (graph 340) of the slave disc drive; the voltage level at the Q output of the flip flop 326 (graph 342) of the slave disc drive; and the external reference signal at the output of the NAND gate 328 (graph 344) of the slave disc drive. As noted above, the internal reference signal generated in each of the disc drives of the data storage system 30 is a negative pulse that terminates in a rising voltage edge, indicated at 346 on the plot 324, that occurs at intervals equal to the desired period of revolution for the discs 62, 64 of the disc drives of the system 30. As also described above, the appearance of the internal reference signal of a master disc drive on the reference terminal 42 of a slave disc drive will cause the voltage state of the reference terminal 42 of the slave disc drive to be high during the time that the internal reference signal from the master disc drive is low. Thus, the voltage state of the reference terminal 42 of the slave disc drive will exhibit a falling edge 348 corresponding to the rising edge 346 of the reference signal from the master disc drive. The significance of such point will become clear below.

Prior to the appearance of a negative reference signal from a master disc drive on the reference terminal 42 of a slave disc drive, such reference terminal will be held at a low voltage level, as indicated at 350, by the master disc drive as described above with respect to operation of the transistor 312, mux 316 and flip flops 318 and 322 so that low voltage levels will be continuously clocked into the Q output terminals of the flip flops 324 and 326 as shown at 352 and 354 respectively. Thus, all inputs to the NAND gate 328 will be low and the output of such gate, which provides the external reference signal, will be high as indicated at 356 in FIG. 11.

With the rise of a fast clock pulse 358 in the master disc drive that gives rise to the slow clock pulse 288 in FIG. 9, the internal reference signal of the master disc drive will go low, as shown at 360, to cause the reference terminal of the slave disc drive to go high as shown at 362. Accordingly, high voltage levels will be consecutively clocked into the Q outputs of the flip flops 324 and 326, as indicated at 364 and 366, by succeeding fast clock pulses 368 and 370. Thus, two fast clock periods into the generation of the internal reference signal in the master disc drive, all inputs to the NAND gate 328 will be high to initiate a negative external reference signal at the output terminal of the gate 328 as indicated at 370. Thereafter, while the internal reference signal generated by the master disc drive continues; that is, for a time interval slightly less than four slow clock periods, the reference terminal 42 of the slave disc drive will remain high and high voltage levels will continuously be clocked into the Q outputs of the flip flops 324 and 326.

With the rise of a fast clock pulse 372 in the master disc drive that terminates the generation of the internal reference signal therein at 346, the reference terminal of each slave disc drive will go high as described above to immediately disable the NAND gate 328 and terminate the external reference signal therein as shown at 374. The Q outputs of the flip flops 324 and 326 are then clocked low by successive fast clock pulses to return the slave disc drive to its original state. As can be seen by comparing graphs 336 and 344, the external reference signal generated in the slave disc drive terminates with the rising edge 374 that is coincident with the rising edge 346 that marks the termination of the internal reference signal in the master disc drive.

The external reference signal is transmitted to the reference selector 122 on a conducting path 376 and to the status register 126 on a conducting path 378 for purposes that will be discussed below.

The Reference Selector

With continuing reference to FIG. 10, the reference selector 122 is comprised of a mux 380 that receives the external reference signal on the conducting path 376 at one input terminal and the internal reference signal on the conducting path 254 on a second input terminal. The Q output of a type D flip flop 382, of which the reference selector 122 is further comprised, is connected to the select terminal of the mux 380, via a conducting path 384, so that either the internal reference signal or the external reference signal can be selected as a reference signal that is transmitted to the reference latch circuit 158 on the conducting path 216 of FIG. 5 by appropriate selection of the voltage level of the Q output of the flip flop 382. Such selection is made by the servo microcomputer 76 via connection of the D input terminal of the flip flop 382 to the microcomputer data bus 88 via a conducting path 386 and connection of the clock terminal of the flip flop 382 to the microcomputer bus 90 via a conducting path 388.

Before continuing, it will be useful to note that the coincidence of rising edges of the internal and external reference signals, 346 and 374 in FIG. 11, will result in coincident entry in the reference latch circuit of all disc drives of the data storage system, whether a drive is a master or a slave, of the count currently in the counter 154 of such drive. Thus, the contents of the index and reference latch circuits of the disc drives of the data storage system 30 provides each disc drive of the system with a measure of the time interval between the occurrence of a common reference signal and the occurrence of an index signal, in that disc drive, that marks a selected orientation of the discs of the drive. Accordingly, by controlling the speed of the motor 66 in a manner to be described below, all discs of all disc drives of the data storage system 30 can be placed in synchronization in which all corresponding points on all data tracks of all discs of all disc drives will pass a transducer head at the same time. Hence, the transfer of files to and from the data storage system can be timed to optimize the transfer rate in the same manner that transfer rate has been conventionally optimized in single disc drives by treating the system 30 as a disc drive comprised of all the discs of all the disc drives of the data storage system 30. Moreover, the presence of host/drive interfaces 74 in all disc drives of the data storage system 30 permits additional techniques, such as storage of portions of data words in separate disc drives, to be utilized to optimize the transfer of files to and from the host computer 32.

The Interrupt Circuit

Referring now to FIGS. 12A and 12B, shown therein is a schematic circuit diagram of the interrupt circuit 124. As will be discussed below, the interrupt circuit 124 can be placed in three modes of operation, one of which is a disabled mode that is used during disc drive start up in which motor speed control is effected using Hall generators utilized in the commutation of windings of the motor 66. Once the motor 66 has reached a speed within five percent of the desired disc rotation rate, speed control is effected in a frequency mode of operation of the disc drive 34, and a corresponding frequency mode of operation of the interrupt circuit 124, in which the disc drives of the data storage system 30 are operated asynchronously or in a phase/master or phase/slave mode of operation of the disc drive 34, and a corresponding phase mode of operation of the interrupt circuit 124, in which the disc drives are operated synchronously as described above in the description of the reference terminal interface 120 and reference selector 122. The selection of the mode of operation of the interrupt circuit 124 is effected by type D flip flops 390 and 392, referred to hereinafter as the interrupt enable flip flop 390 and the mode selection flip flop 392, which have D input terminals connected to separate lines of the servo microcomputer data bus 88, via conducting paths 394 and 396 respectively, and which have clock terminals connected to the servo microcomputer control bus via a conducting path 398 so that the servo microcomputer 76 can output a mode selection word to the flip flops 390 and 392.

A negative interrupt signal is generated in the interrupt circuit 124 at the output of a four input NOR gate 400 and transmitted therefrom to an interrupt terminal of servo microcomputer 76 via a conducting path 402 (See FIG. 2). One input of the NOR gate is connected to the output of an AND gate 404 having one input connected to the Q output terminal of a type D flip flop 406. The flip flop 406 has an inverting clear terminal that is connected to the output of an AND gate 408 which receives the voltage level at the Q output of the interrupt enable flip flop 390 via conducting paths 410 and 412 so that, at such times that the voltage level of the Q output of the interrupt enable flip flop 390 is low, the Q output of the flip flop 406 will be held low to disable the AND gate 404 from causing an interrupt signal to be generated. A second input terminal of the NOR gate 400 is connected to the output of an AND gate 414 which has one input terminal connected to the Q output of a type D flip flop 416 which similarly has an inverting clear input terminal. Further, the inverting clear input terminal of the input terminal of the flip flop 416 is similarly connected to the output of an AND gate 418 and one input terminal of the AND gate 418 is connected, via conducting paths 420 and 422, to the output terminal of an AND gate 424 whose inputs are connected to the Q outputs of the flip flops 390 and 392. Thus, at such times that a low voltage level appears at the Q output of the interrupt enable flip flop 390, the AND gate 424 will be disabled to, in turn, disable AND gate 418 and hold the flip flop 416 in a cleared condition. Such condition disables AND gate 414 so that the flip flop 416 will similarly be unable to cause an interrupt signal to be transmitted to the servo microcomputer 76. The remaining two inputs of the NOR gate 400 are connected, via conducting paths 426 and 428 to circuits that will be discussed below and which are also caused to provide low voltage signals to the NOR gate 400 at such times that a low voltage level appears on the conducting paths 412 and 422; that is, when the voltage level at the Q output of the flip flop 390 is low. Thus, the interrupt circuit 124 can be disabled to prevent interruption of the servo microcomputer 76 by outputting a logic level 0 to the interrupt enable flip flop 390.

The AND gates 408 and 418 can also be used to clear the flip flops 406 and 416 in response to signals received from the servo microcomputer. To this end, the second input terminal of the AND gate 408 is connected to the output of a NAND gate 426 having one input connected via an inverter 428 to the conducting path 398 leading to the control bus 90 and the other input connected via a conducting path 430 to one conductor of the data bus 88. (The presence of the inverter 428 contemplates that conductors of the control bus 90 are normally held high by the servo microcomputer 76.) Thus, the flip flop 406 can be cleared by outputting a high voltage level to the NAND gate 426 to cause the output of such gate to go low and disable the AND gate 408. In the absence of such an output from the servo microcomputer, the AND gate 408 will be controlled solely by the flip flop 390 so that the flip flop 406 will be held clear only if a low voltage exists at the Q output of the interrupt enable flip flop 390. One input of the AND gate 418 is similarly connected via a NAND gate 432, inverter 434 and conducting path 436 to the servo microcomputer data and control buses so that the flip flop 416 can be cleared by outputting a high voltage level to one input of the NAND gate 432. In the absence of such a microcomputer directed clear, the flip flop 416 will be held in a clear state when the Q output of either of the flip flops 390, 392 are low via disablement of the AND gate 424.

In the frequency mode of operation of the interrupt circuit 124, the Q output of the of the mode selection flip flop is made low so that the AND gate 424 will be disabled to disable AND gate 418 and hold the flip flop 416 in a cleared state. The output of the AND gate 424 is further transmitted, via an inverter 438 to the second input terminal of the AND gate 404 so that an interrupt can be generated by clocking the Q output of the flip flop 406 high. Such clocking is effected by connecting the D input terminal of the flip flop 406 to a pull up 440 via a conducting path 442 and connecting the clock terminal of the flip flop 406 to the conducting path 218 upon which the index latch signal, generated to enter the count in the counter 154 into the latch 178 of the index latch circuit 116, appears. Accordingly, in the frequency mode of operation of the interrupt circuit, an interrupt signal will be generated each time the contents of the counter 154 are entered into the index latch circuit 116.

In the phase mode of operation of the interrupt circuit 124, the Q output of the mode selection flip flop 392 is selected to be high to enable the AND gate 424 and terminate clearing of the flip flop 416. At the same time, the inverted output of the AND gate 424 is transmitted to the AND gate 404 to prevent the generation, as just described, of an interrupt signal by an index latch signal. However, the reception of an index latch signal will still clock a high voltage level into the flip flop 406 and such level is transmitted to one input of the AND gate 414 so that an interrupt signal can be generated by the gate 414. Such interrupt is generated by connecting the D input of the flip flop 416 to the conducting path 442 leading to the pull up 440 and connecting the clock input of the flip flop 416 to the conducting path 220 upon which the corresponding reference latch signal appears when the contents of the counter 154 are entered into the reference latch circuit 158. Thus, in the phase mode of operation of the interrupt circuit 124, corresponding to both the phase/master and phase/slave modes of operation of the motor speed control circuit 108, an interrupt signal is generated when counter 154 contents are entered into both the index and reference latch circuits.

Referring to FIG. 12B, the interrupt circuit 124 is further comprised of a missing index detector 444 and a missing reference detector 446 that provide alternatives to generation of interrupt via the operation of the flip flops 406 and 416 described above. More particularly, the missing index detector 444 generates an interrupt signal in the frequency mode of operation of the interrupt circuit 124 in the absence of an index latch signal for a time period no greater than to three periods of revolution of the motor 66 and the missing reference detector similarly generates an interrupt signal, in the phase mode of operation of the interrupt circuit 124 in the absence of a reference latch signal for a time period no greater than three periods of revolution of the motor 66.

To the first of these ends, the missing index detector is comprised of serially connected type D flip flops 448, 450 and 452 that are each clocked by the internal reference signal generated by the internal reference generator 118 and transmitted to the missing index detector 444 on the conducting path 256 and the D input of the flip flop 448 is connected to the conducting path 442 leading to the pull up 440 so that, in the absence of clearing of the flip flops 448, 450 and 452, a high voltage level will be clocked by three successive internal reference signals from the pull up 40 to the Q output of the flip flop 452. Such output is connected to the conducting path 426 leading to one input of the NOR gate 400.

Clearing of the flip flops 448, 450 and 452 is effected by the transmission of a low voltage level at the output of a NOR gate 454 to inverting clear inputs of the flip flops 448, 450 and 452 and occurs whenever the interrupt circuit 124 is disabled by a low voltage level at the Q output of the interrupt enable flip flop 390, in response to signals outputted to the interrupt circuit 124 to clear the flip flops 406 and 416 and each time an index latch signal is transmitted to the interrupt circuit from the index latch circuit 156. Clearing of the flip flops in the first of these cases is effected by connection of the conducting path 412 from the Q output of the interrupt enable flip flop 390 to one input terminal of the NOR gate 454 via an inverter 460; clearing in the second case is effected by connecting one input of the NOR gate 454 to the output of an AND gate 462 having one input connected, via an inverter 464, to the conducting path 398 to the control bus 90 and having the other input connected to the data bus 88 via a conducting path 466; and clearing in the third case is effected by the connection of the third input of the NOR gate 454 to the output of an AND gate 468 having one input connected to the normally high QN output of the flip flop 452 and the other input connected to the conducting path 218 upon which the index latch signal appears each time a count is entered into the index latch circuit 156.

The missing reference detector 446 is constructed identically to the missing index detector to provide a high signal on the conducting path 428 to the NOR gate 400 in the absence of a reference latch signal on the conducting path 220 from the reference latch circuit 158. Connections to the missing reference detector 446 to provide for clearing of flip flops therein in cases analogous to the cases described above for the missing index detector 444 are analogous to the connections made to the latter. Specifically, to provide for clearing of the missing reference detector 446 analogously to clearing of the missing index detector 444, the missing reference detector receives the output of the AND gate 424 in place of the voltage level at the Q output of the flip flop 390 so that the missing reference detector is inoperative whenever the interrupt circuit is in a mode other than the phase mode; to provide for clearing of the missing reference detector 446 analogously to clearing of the missing index detector 444 by the servo microcomputer, the missing reference detector is connected to the data bus 88 and the conducting path 398 leading to the control bus 90 via conducting paths 470 and 472 respectively; to provide for clearing of the missing reference detector by a reference latch signal analogously to clearing of the missing index detector by an index latch signal, the missing reference detector receives the reference latch signal on the conducting path 220 that has been carried into FIG. 12B.

Referring once again to FIG. 12 A, it will be recognized by those skilled in the art that generation of interrupts will normally be effected by reception of index latch signals or index and reference latch signals at the flip flops 406 and 416 so that generation of interrupts by the missing index and missing reference circuits indicates abnormal operation of the motor speed control circuit 108. To detect such abnormal operation, conducting paths 476 and 478, connected to the conducting paths 426 and 428 from the missing index and missing reference circuits, extend to the status register 126 for reading by the servo microcomputer 76 as will be discussed below.

The Status Register

Referring to FIG. 13, the status register 126 is comprised of tri-state gates 480, 482, 484 and 486 having output terminals connected to the data bus 88 so that voltage levels at the inputs of these gates can be read by a negative read enable pulse, delivered from the servo microcomputer 76, to inverting enable terminals of these gates via a conducting path 486 to the control bus 90. The first of these gates; that is, gate 480, is used to detect the current state of the reference terminal 42 and is connected to the output terminal of the NAND gate 328 of the reference terminal interface 120 via the conducting path 378 that has been carried into FIG. 13 from FIG. 10 and an inverter 492.

The gate 482 is used to detect previous occurrences of reference signals on the reference terminal 42 and, for this purpose, the input of the gate 482 is connected to the Q output of a type D flip flop 494, referred to herein as the arbitration latch 494, whose clock terminal is connected to the output of the inverter 492 via a conducting path 496 and whose D input is connected to a pull up 498. As will be clear from the generation of an external reference signal described above, the output of the inverter 492 will go high at the commencement of an external reference signal so that the output of the arbitration latch 494 will go high shortly after the internal reference signal of a disc drive of the system 30 appears at the reference terminal 42. Thus, and with one exception, if the disc drive 34 is operating as a master drive, the arbitration latch will detect such operation at the time that an interrupt is generated by the concurrence of both a reference latch signal and an index latch signal. Specifically, the interrupt can occur in the phase/master mode of operation of the disc drive 34 only with the rising edge that occurs at the termination of a reference signal to provide a reference latch signal and clock the Q output of the flip flop 416 (FIG. 12A) of the interrupt circuit 124 high. The exception occurs when two disc drives, or a disc drive and the host computer 32, attempt to operate as a master drive to provide the source of a reference signal. In this case, both will pull the voltage level of the reference terminal 42 to ground, despite the nonconducting state of the transistor 312 of each drive during the presence of a reference signal on the connected reference terminals of such drives, so that the reference terminals of both drives will remain low during the times that the internal reference signals of both are transmitted to the bases of their respective transistors 312. The arbitration latch can be cleared by the servo microcomputer 76 via an inverter 500 and a NAND gate 502. Specifically, the inverter 500 is connected between one input of the NAND gate 502 and the control bus 90, via conducting paths 504 and 506, and the other input of the NAND gate 502 is connected to the data bus 88 via a conductor 508 so that a negative write enable signal on the conducting path 504 coupled with a high voltage outputted to the NAND gate 502 will cause the output terminal of the NAND gate 502, which is connected to an inverting clear terminal of the arbitration latch 494, to go low and clear the arbitration latch 494.

The inputs of the remaining two tri-state gates, 484 and 486, receive the indications of missing index and reference signals on the conducting paths 476 and 478 from the interrupt circuit 124.

The Motor Drive Circuit

Referring now to FIG. 14, the motor drive circuit 128 is comprised of a free running counter 510 that is continuously clocked by fast clock signals received on a conducting path 512 and the conducting path 132 that has been carried into FIG. 14 from FIG. 4. The count outputs of the counter 510 are transmitted to an A input of a comparator 514 via a bus 516 and the comparator also receives, at a B input, a motor speed control word from the servo microcomputer 76 in a manner that will be described below. The comparator 514 is of the type that compares the binary words at the A and B inputs and provides a low voltage level at an inverting output terminal at such times that the two words are the same.

The output terminal of the comparator 514 is connected to one input of a NAND gate 518 having an output connected to the D input of a type D flip flop 520 that is continuously clocked by the fast clock signals received at the clock terminal thereof on the conducting path 132. As will be clear to those of skill in the art, the Q output of the flip flop 520 will be clocked high each time the count in the counter 510 is the same as the motor speed control word and such output is transmitted via conducting path 522 to one input of a NAND gate 524, the other input of which is connected to an inverting zero decode terminal of the counter 510 via conducting paths 526 and 528. The zero decode terminal provides a high voltage level at all times other than times that the count in the counter is zero so that, for a nonzero motor speed control word at the B input of the comparator 514, the input to the NAND gate 524 from the counter 510 at the time that the Q output of the flip flop 520 goes high will also be high. Thus, the result of the equality of the count in the counter 510 and the motor speed control word will be to provide a low voltage level at the output of the NAND gate 524.

The output of the NAND gate 524 is connected to the the NAND gate 518 and, consequently, the Q output of the flip flop 520 will remain high until the counter reaches a count of zero. At that time, the output of comparator 514 will be high, to drive one input of the NAND gate 518 high, and the drop in the voltage level at the zero decode terminal of the counter 510 will cause the output of the NAND gate 524, and the other input of the NAND gate 518, to become high. Accordingly the NAND gate 518 output will go low to clock a low voltage level into the Q output of the flip flop 520. The connection between the Q output of the flip flop 520 and one input of the NAND gate 524 will cause the output of the NAND gate 524 to remain high to cause the output of NAND gate 518 to remain low until the next concurrence of the count in the counter 510 and the motor speed control word. Thus, the overall operation of the motor speed control circuit 128 is to cause the Q output of the flip flop to be low while the counter 510 counts up to the motor speed control word and high thereafter until the end of one counting cycle of the counter 510. Conversely, the QN output of the flip flop 510 will be high while the count up to the motor speed control word occurs and thereafter low until the count in the counter 510 rolls over to zero.

The QN output of the flip flop 520 is connected to a low pass filter 526 that is in turn connected to a power and commutation circuit 528 that passes current through the windings of the motor 66 in proportion to the d.c. voltage level at the output of the filter 526. A suitable construction for the power and commutation circuit 528 is taught in U.S. patent application Ser. No. 693,356 filed Apr. 30, 1991 by Genheimer et al. and entitled "Motor Construction and Method for Limiting Spin-up Time in a Hard Disc Drive", the teachings of which are hereby incorporated by reference. Thus, the current passed through the windings of the motor 66 is directly proportional to the magnitude of the control word supplied to the comparator 514.

Before discussing the manner in which the motor speed control words are provided to the comparator 514 by the servo microcomputer 76, it will be useful to first briefly consider a problem that can arise in the operation of a disc drive such as the disc drive 34. As is known in the art, sharply rising or dropping edges in control signals give rise to transients that can cause oscillation in the system that is being controlled. More particularly, in the case of the motor 66, such transients can cause the speed of the motor to undergo variations that would interfere with the use of the disc drive 34 to store computer files. One source of possible rotatory oscillations, edges in the signals at the QN output of the flip flop 520, can be easily corrected. The rotational frequency of a motor in a hard disc drive is typically less than 100 hz while fast clocks used in disc drives have frequencies typically in the range of 10 to 25 mhz. Thus, if the counter 510 is an eight bit counter, the frequency with which the counter cycles through a complete count is of the order of 4 to 10 khz, a value that greatly exceeds the frequency of rotation of the motor 66. As a result, the cutoff frequency of the low pass filter 526 can easily be selected to effectively eliminate transients arising from operation of the flip flop 520.

However, changes in the motor speed control word also have the effect of introducing edges in control signals supplied to the power and commutation circuit 528 and, because of the control of the motor speed in relation to values in the index and reference latch circuits, 156 and 158 respectively, both of which are updated at intervals of substantially one period of revolution of the motor 66, such transients cannot be filtered by low pass filter 526 without making motor speed control so sluggish as to preclude use in a hard disc drive. While the problem can be solved by the use of digital signal processing techniques that have the effect of filtering the control words, a second problem is introduced. Digital signal processing requires update of the control words at substantially equal time intervals and it may not be desirable to interrupt the microprocessor 76, to calculate and output a motor speed control word as will be described below, while it is engaged in a control of the actuator 72. The present invention solves this problem by updating the motor speed control word only at the generation of each index latch signal following an index latch signal that interrupts the microcomputer 76 so that updates of the motor speed control words occur at equal intervals, enabling digital filtering of such words and, concurrently providing a full period of revolution of the motor 66 for servicing the interrupt. Because of the extremely low frequency of the motor in relation to the fast clock that is used for clocking the servo microcomputer 76, the interrupt can easily be accommodated in this time.

To effect the accommodation of digital filtering with interruption of the servo microcomputer 76 at times that will not interfere with its normal servo task, the motor drive circuit 128 is further comprised of: a control word entry latch 530, which enters the motor speed control word from the servo microcomputer data bus 88 in response to a load signal, generated at the falling edge of a negative write enable signal, received from the control bus 90 via a conducting path 532 and an inverter 534; a control word output latch 536 that has input terminals connected to the output terminals of the latch 530 via a bus 538 and output terminals connected to the B input of the comparator 514 via a bus 540; and a control word transfer circuit 542, more particularly shown in FIG. 15, that provides a load signal to the latch 536 on a conducting path 544 in response to index latch signals received on the conducting path 218 that has been carried into FIGS. 15 from FIG. 3. The control word transfer circuit also receives the control signal on the conducting path 532, the fast clock signal on the conducting path 132, and the zero decode signal on the conducting path 528 as similarly indicated by carrying these conducting paths into FIG. 15 and indicating connections (not numerically designated) between these conducting paths and the control word transfer circuit 542 in FIG. 14.

Referring to FIG. 15, the control word transfer circuit 542 is comprised of a type D flip flop 552 having a clock terminal connected to the conducting path 532, that is utilized to load the motor speed control word into the control word entry latch 530, and a D input terminal connected to a pull up 554 via a conducting path 556. Thus, as the negative control signal used to enter a new motor speed control word into the control word entry latch 530 returns high; that is, after the new motor speed control word has been entered, a high voltage level is clocked into the Q output of the flip flop 552. This level is transmitted to one input of an AND gate 558, the other input of which is connected to the output of an OR gate 560. One input of the OR gate 560 is connected to the Q output of a type D flip flop 562 that is clocked by index latch signals received from the index latch circuit 156 on the conducting path 218 and has a D input connected to the pull up 554 via the conducting path 556 and a conducting path 564.

During operation of the transfer circuit 542, the flip flops 552 and 562 are cleared each time the transfer of a motor speed control word between the latches 530 and 536 occurs so that the AND gate 558 will be enabled only at such times that an index latch signal occurs following entry of a motor speed control word into the control word entry latch 530. The output of the AND gate 558 is connected to the D input of a type D flip flop 566 whose clock terminal is connected to the Q output of a type D flip flop 568 via a conducting path 570. The Q output of the flip flop 566 is connected to one input of a NAND gate 572, the other input of which is connected to the QN output of the flip flop 568, and the output of NAND gate 572 is connected to the load terminal of the control word output latch 536 via an inverter 574 and the conducting path 544. The flip flop 568 is clocked by fast clock signals received from the clock circuit 114 on the conducting path 132 and the D input of the flip flop 568 is connected to the zero decode terminal of the counter 510.

Reception of an index latch signal from the index by the flip flop 552 will cause the Q output of such flip flop 552 to go high so that the output of the AND gate 558, one input of which has gone high with the entry of the motor speed control word, will go high. Thus, when the first zero decode signal following reception of the index latch signal occurs and is clocked through the flip flop 568 by the clock pulses, the Q of flip flop 568 will drop, during the reception of the zero decode signal, and then rise. Such rise will clock the high voltage level at the output of AND gate 558 into the Q output of flip flop 566. When the next zero decode signal is received by flip flop 568, the fast clock will clock a low voltage level into the Q output of such flip flop and concurrently drive the QN output thereof high. Thus, the NAND gate 572 will be enabled by the high voltage levels at the Q output of flip flop 566 and the QN output of the flip flop 568 to cause the output of NAND gate 572 to go low. The output of the inverter 574 consequently goes high to transfer the motor speed control word from the control word entry latch 530 to the control word output latch 536 via the connection of the output of the inverter 574 to the load terminal of the control word output latch 536 provided by the conducting path 544.

The output of the NAND gate 572 is also connected to inverting clear terminals of the flip flops 562 and 552 via a conducting path 573 and, for the flip flop 562, via an AND gate 574, so that both flip flops 552 and 562 are cleared with transfer of the motor speed control word. The other input of AND gate 574 is connected to the conducting path 532 by means of which control signals that load the control word entry latch 530 are received. This connection clears the flip flop 562 so that the transfer of the motor speed control word can occur only with the index latch signal that follow entry of the new motor speed control word into the motor drive circuit 128.

During spin up of the motor 66, it is contemplated that the motor will be continuously supplied with electrical power and such supply is effected by entering a motor speed control word having the maximum value countable by the counter 510 into the counter 510 after enabling the OR gate 560 via a type D flip flop 578. Specifically, the Q output of the flip flop 578 is connected to a second input of the OR gate 560 and the D input and clock terminals thereof are connected to the data and control buses of the servo microcomputer 76 via conducting paths 580 and 582 respectively so that subsequent entry of the motor speed control word will initiate the transfer of the motor speed control word to the control word output latch. It is further contemplated that the motor 66 can be held in a power off state and such state is achieved by a type D flip flop 584 having a Q output terminal connected to an inverting set terminal of the flip flop 520 which provides the power signal to the low pass filter 526 and the power and commutation circuit 528. The D input terminal of the flip flop 584 is connected to the data bus 88 via a conducting path 586 ant the conducting path 532 to the control bus 90 is extended via a conducting path 588 to the clock terminal of the flip flop 584 so that the servo microcomputer 76 can set the flip flop 520 by outputting a low voltage signal to the flip flop 584.

Operation

The operation of the data storage system 30 in general and of the hard disc drive 34 in particular has been illustrated by flow charts presented in FIGS. 16 through 24. Referring first to FIG. 16, shown therein is the main program for the disc drive 34 from the time power is applied to the disc drive 34 as indicated by the start block 590.

Following start up of the drive 34, the motor speed control circuit 108 is initialized by outputting operating parameters at an initialization block 592, in particular, the durations of the slow and auxiliary clocks, selected by outputting either a high or low voltage to the flip flop 148 of FIG. 4, and twice the desired time, in slow clock periods, of revolution of the discs of the drive 34, selected by outputting such time to the revolution time latch 170 in FIG. 5. Additionally, the motor 66 is turned off by outputting a low voltage level to the flip flop 584 of FIG. 14, the interrupt circuit 124 is disabled by outputting a low logic level to the flip flop 390 of FIG. 12A, and the internal reference signal generated by the disc drive 34 is selected as the reference signal to cause entry of counts in the counter 154 into the reference latch circuit 158 by outputting an appropriate voltage level to the flip flop 382 of the reference selector 122 shown in FIG. 10. (Alternatively, these flip flops can be cleared by a hardware reset that is active at power up of the drive 34.) The arbitration latch 494 is cleared by a low voltage level outputted to the NAND gate 502 of FIG. 13 and base of transistor 312 (FIG. 10) is grounded by outputting a voltage level to the flip flop 322 that will cause the mux 316 to transmit the Q output of flip flop 318 to the transistor 312 and outputting a low voltage level to the flip flop 318. Thus, if the reference terminals 42 of a plurality of disc drives are interconnected by the jumper 54, the reference terminal will be allowed to float high.

The initialization further includes internal operations in the servo microcomputer 76 of the hard disc drive 34 and as well as the other hard disc drives of the data storage system 30. Specifically, flags, to be discussed below, used in the operation of the motor speed control circuit 108, are set, or reset, as appropriate, and selected memory locations in RAM of the servo microcomputer 76, similarly used in the operation of the motor speed control circuit 108, are initialized for purposes also to be discussed below. One such memory location is a location used to store a count of lost index signals provided by the missing index detector 444 in FIG. 12B and such count is initially set to zero.

Following initialization, the lost index count, which will be zero at start up, is checked to see if such count has reached a preselected number indicated as N in FIG. 16, decision block 594, and spin up of the motor 66 is commenced by outputting a maximum count to the counter 510 of the motor drive circuit 128 shown in FIG. 14, a low voltage level to the flip flop 584 and a high voltage level to the flip flop 578 in FIG. 15. (The purpose of the lost index count and the decision immediately following initialization of the motor speed control circuit 108 will become clear below.)

During spin up, control of the speed of the motor 66 is effected, block 596, using Hall generators (not shown) of which the motor 66 is comprised and, preferably, is effected in the manner described in the aforementioned U.S. patent application Ser. No. 693,356. Such control includes periodically reading the state of a selected Hall generator and determining therefrom the speed at which the rotor of the motor is turning. While the speed of the rotor is less than 95 percent of the selected operating speed, indicated by the decision block 598, the Hall generator control of motor speed continues as indicated by the path 600 that indicates return of the program to Hall generator control below 95 percent of operating speed. As will be recognized by those of skill in the art, the initial operation of the motor 66 under Hall generator control permits the disc 64, the upper surface of which is the dedicated servo surface, to attain a rotation rate sufficient for servo patterns on the servo surface to be read so that index signals will be generated by the actuator control circuit 78.

Once the speed of the motor 66 has reached 95 percent of the selected operating speed, the interrupt circuit 124 is enabled, block 602, by outputting a high voltage level to the flip flop 390 of FIG. 12A and, further, the interrupt circuit 124 is enabled to generate an interrupt signal each time an index signal is received from the actuator control circuit 78 by outputting a low voltage level to the flip flop 392 of FIG. 12A. Concurrently with enablement of the interrupt circuit 124, a low voltage level is outputted to the flip flop 578 of FIG. 15 so that motor speed control words entered into the control word entry latch 530 will be transferred to the control word output latch only following reception of an index latch signal as described above. Control of the motor speed is subsequently effected by an interrupt routine for which a general flow chart flow chart is presented in FIG. 17.

Figures 17, 20:
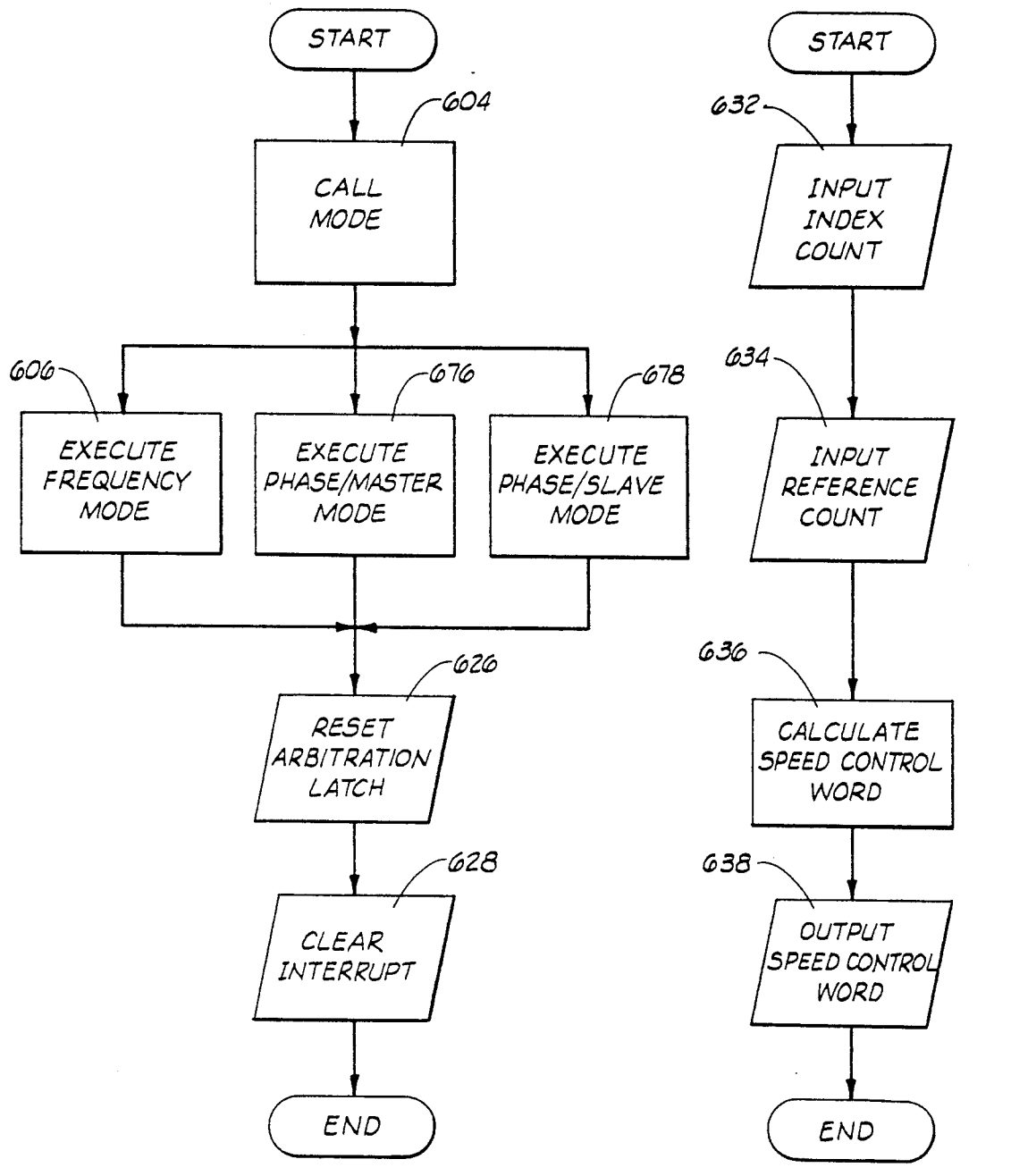
FIG. 17 is a flow chart of the interrupt program of the servo microcomputer.
FIG. 20 is a flow chart of a speed control routine utilized to generate speed control words.
Figure 21:
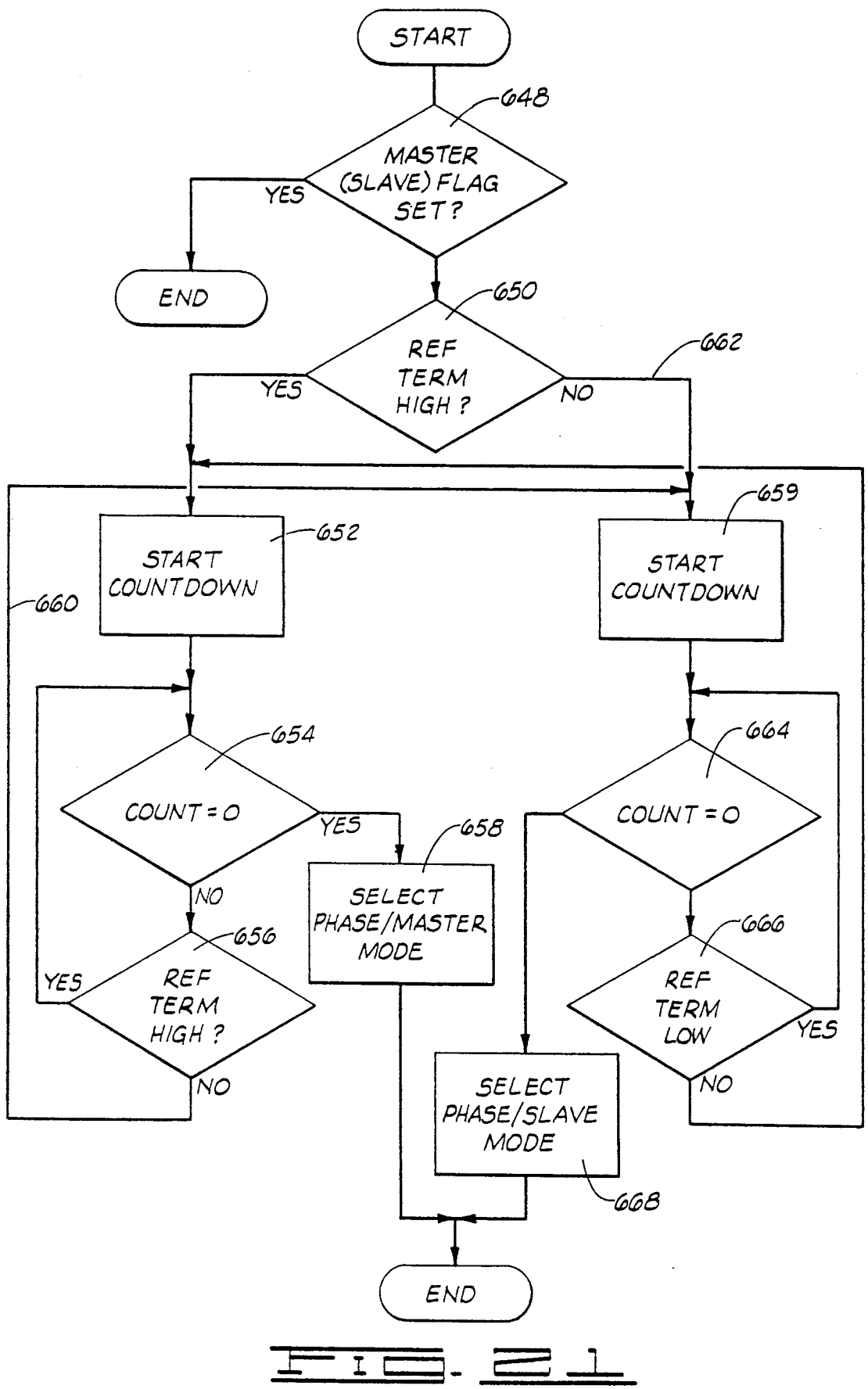
FIG. 21 is a flow chart of an initial arbitration routine executed during start u of the disc drives of the present invention.

As shown in FIG. 17, the initial step of the interrupt program, block 604, is to call one of three modes of operation of the disc drive 34, more specifically the motor speed control circuit 108, and such call is made by a jump to a memory location determined by a mode number stored in a selected RAM location of the servo microcomputer 76. During the initialization step 592, the mode number is set to call for execution, block 606, of a frequency mode of operation, a flow chart for which is presented in FIG. 18 to which attention is now invited.

The first step in the frequency mode routine is the input, block 608, of the contents of the status register 126 which provides information including the failure of the interrupt circuit to generate an interrupt in response to an index signal. Thus, for example, the initial interrupt following enablement of the interrupt circuit 124 might have occurred as the result of operation of the missing index circuit 44 of FIG. 12B in which case a high voltage level will be present at the output of the gate 484 of FIG. 13. Following input of the status register, a check for a lost index indicated by interruption by the missing index circuit 444 is carried out, block 610, and, if a lost index has occurred, an error condition signal is outputted to the system microcomputer 80, block 612, the contents of the memory location in which counts of lost indices are stored is incremented, block 614, and the start up routine is re-initiated as indicated by the program connector labelled A in both FIGS. 18 and 16.

If the index has not been lost, the index lost count location in the memory of the servo microcomputer 76 is cleared, block 616, and a first time flag is checked, block 618. During the initialization step 592 of FIG. 16, this flag is set so the servo microcomputer will proceed to a data loading routine shown in FIG. 19 as indicated by the program connector B in both FIG. 18 and FIG. 19. In the data loading routine, the contents of the index and reference latch circuits are inputted, blocks 620 and 622, to obtain initial values for calculation of a motor speed control word, the first time flag is reset, and the frequency mode routine ends to return the servo microcomputer 78 to the general interrupt program (FIG. 17). As shown in FIG. 17, the interrupt is completed by resetting the arbitration latch 424, block 626, by outputting a high voltage level to the NAND gate 502 in FIG. 13, and clearing the interrupt circuit, block 628, by outputting a high voltage level to the NAND gates 426 and 432 of FIG. 12A, the AND gate 462 of the missing index detector 444 in FIG. 12B, and the corresponding AND gate of the missing reference detector 446.

Where no index signals are lost, the next interrupt will proceed as described above to decision block 618 in FIG. 18. Since the first time flag has been reset in the preceding data loading routine, the servo microcomputer 76 will proceed to the execution of a speed control routine, block 630, a flow chart of which has been presented in FIG. 20. In the speed control routine, the counts stored in the index and reference latch circuits 156, 158 are again inputted, blocks 632 and 634, so that values of two successive counts in the counter 154, corresponding to successive passages of the index pattern on the dedicated servo surface by the transducer 70, will have been inputted from the index latch circuit 156. Since the counter 154 is clocked at a steady rate, the difference of these two counts is a measure of the speed of the motor 66 so that an error value, used in the frequency mode of operation of the disc drive 34, can be defined as the difference between the desired speed of rotation and the speed determined from successive counts in the index latch circuit 156. In the frequency mode of operation of the disc drive 34, the motor speed control word is calculated, block 636, preferably using a PID control scheme and digital filtering, for output, block 638, to the control word entry latch 530 of the motor drive circuit shown in FIG. 14.

As will be discussed below, the disc drive 34 can also be operated in phase/slave and phase/master modes of operation in which it is desirable to cause the index signal generated by the actuator control circuit 78 to coincide with a reference signal, either the internal reference signal generated by the internal reference generator 118 of the disc drive 34 or an external reference signal generated by another drive of the data storage system 30. Such control is effected by redefining the error signal to be the difference in the current counts in the index and reference latch circuits, 156 and 158, and suitably changing coefficients in the equation by means of which the digitally filtered motor speed control word is calculated from the error signal.

Following the calculation and output of the motor speed control word, the speed control routine returns to the frequency mode routine shown in FIG. 18 and checks to determine whether an arbitration flag, set during the initialization step 592 of FIG. 16 is reset, bock 631 of FIG. 18. If not, the frequency mode routine ends with a return to the general interrupt program show in FIG. 17 to complete the interrupt with the reset of the arbitration latch 424 and clearing of the interrupt circuit 124, blocks 626 and 628. Since the arbitration latch 424 is reset in the initialization of the disc drive 34, the disc drive will continue to effect frequency mode motor speed control during ensuing interrupts.

As has been described above, with respect to FIG. 18, the frequency mode routine returns to the main program when a missing index signal, as detected by the missing index detector 444 as described above, occurs. If the actuator control circuit 78 only occasionally fails to generate an index signal, the servo microcomputer will return to the main program to repeat the spin up of the motor and such return will have been indicated to the system microcomputer 80 so that no attempt will be made to store or retrieve a file from the disc drive 34 until motor speed control has been achieved. Once speed control has again been achieved, the index lost count will be cleared (block 616, FIG. 18) and normal operation of the disc drive will ensue. However, if the disc drive has become defective so that proper motor speed control cannot be effected because of an inability of the actuator control circuit to generate the index signals that mark passage of the discs through a specific orientation, the index lost count will be incremented with each interrupt that occurs following the interrupt enable block 602 of FIG. 16 until the count reaches the count N in the decision block 594. At that time, an error condition indicating inoperability of the disc drive 34 will be outputted to the system microcomputer 80, block 640, and the servo microcomputer 76 will execute a power down routine, block 642, normally executed at the end of operation of the disc drive 34.

As will be clear from the above discussion, in all but rare circumstances, the enablement of the interrupt circuit 124 at block 602 of the main program of the servo microcomputer 76 shown in FIG. 16 will result in stable motor speed control being achieved via the frequency mode routine shortly after the disc drive 34 is powered up. While such control exists, the servo microcomputer 76 carries out conventional servo system calibration routines, block 644, and then enters an initial arbitration routine, block 646, that will select a master drive from among the disc drives that have been interconnected at their reference terminals 42 to form a data storage system 30. A flow chart for the initial arbitration routine has been presented in FIG. 21 to which attention is now invited. For purposes of discussion. it will be assumed that the disc drive in which the routine is carried out is the disc drive 34.

It is contemplated that the host computer may designate one disc drive of the data storage system 30 to be a master disc drive and the remaining disc drives to be slave disc drives. If so, commands will be sent to the disc drives to indicate the designation of each drive and each drive will respond by setting a master or slave flag in the servo microcomputer 76. The first step of the initial arbitration routine will be to check the status of the master and slave flags, block 648, and if either flag is set, the initial arbitration routine ends. However, in the initialization step 592, the master and slave flags are reset so that an initial arbitration among the disc drives of a system 30 will occur when the system 30 is powered up. (The decision block 648 will become effective only if it becomes necessary, because of a malfunction of the system 30 or a disc drive of the system 30, to re-initiate operation of a disc drive of the system 30. In such case, a selection made by the host computer 32 provides an override that causes the disc drives to assume their designated roles instead of arbitrating to select a master drive.)

Following the check of the master and slave flags, the disc drive 34 will check the state of the reference FIG. 18 as described above, to determine whether another disc drive has assumed the role of a master drive. Such check begins with an input of the status register 126 for determination of whether the reference terminal is high as indicated by the decision block 650 of FIG. 21. If so, the reference terminals might be floating high because of the absence of any disc drive in a master drive role or because a drive in such a role is currently outputting a reference signal to the jumper 54 connecting the reference terminals of the disc drives of the system 30. To exclude the latter possibility, a countdown of a time period greater than the duration of a reference signal is started, block 652, and the disc drive 34 enters a loop in which the state of the countdown is repetitively checked for expiration of such time period, block 654, and repeated inputting and checking of the voltage state of the reference terminal 42, block 656, if the countdown has not expired. If the reference terminal remains high during the countdown, indicating that no other disc drive has assumed the role of a master drive, the disc drive 34 will select the phase/master mode of operation, block 658. Specifically, the mode number stored in the servo microcomputer RAM is set to call the phase/master mode routine at the next interrupt; voltage levels that will cause the reference selector 122 to select the internal reference of drive 34 as the reference signal for entry of the contents of counter 154 into the reference latch circuit 158 and will cause the internal reference signal to be transmitted by the mux 316 to the base of transistor 312 are outputted to the flip flops 382 and 322 of FIG. 10; and voltage levels are outputted to the flip flops 390 and 392 of the interrupt circuit 124 that will cause operation of the interrupt circuit in the phase mode. Additionally, the first time flag is set. The initial arbitration routine then ends.

If the reference terminal goes low before the expiration of the countdown, the disc drive 34 executes a routine that is designed to cause the drive 34 to defer to a disc drive that has previously assumed the role of a master. Such routine, beginning with the initialization of a countdown, block 659, is reached either by the path 660 from the decision block 656 or by the path 662 from the previously noted decision block 650. Following the countdown initiation 659, the disc drive enters a loop in which the current state of the count down is repetitively checked for expiration, decision block 664. For each repetition in which the count has not expired, the state of the reference terminal 42 is again checked, decision block 666, to determine whether the reference terminal has remained low. If not, the program returns to the decision block 652 to determine whether the disc drive is to assume the role of a master drive. More particularly, it is assumed that a voltage rise that exists for only a short time, of the order of the time of generation of a reference signal, will not indicate that another disc drive has assumed the role of a master. Hence another routine that can end in the disc drive 34 assuming the role of a mater drive is performed. However, if the countdown expires with the reference terminal 42 remaining low, indicating that another disc drive has assumed the role of a master drive, the disc drive 34 will select the phase/slave mode of operation, block 668, by: entering the mode number of the slave mode routine in the reserved location for the mode number in RAM; outputting voltage levels to the flip flops 382, 322 and 318 of FIG. 10 that will cause selection of an external reference as the reference signal that enters the count in counter 154 into the reference latch circuit 158 and will cause the base of transistor 312 in FIG. 10 to be grounded; and outputting voltage levels to the flip flops 390 and 392 of the interrupt circuit 124 that will cause operation of the interrupt circuit in the phase mode. Additionally, the first time flag will be set. The initial arbitration routine then ends.

The overall result of the initial arbitration routine will be that one of the disc drives of the data storage system 30, usually the first disc drive to reach the selected motor speed, will become a master drive for the system and the remaining disc drives will become slave drives.

Returning to FIG. 16, following the initial arbitration routine 646, the arbitration flag is set, block 670, to permit the disc drive 34 to leave the frequency mode of operation, should it subsequently be placed in such mode as will be discussed below, at the decision block 631 of FIG. 18; a ready condition is outputted to the system microcomputer 80, block 672, for transmission to the host computer 32; and the servo microcomputer 76 enters an idle loop, block 674, in which it executes servo commands received from the system microcomputer 80. Such commands can include commands relayed from the host computer to assume the role of a master or a slave and such commands are implemented by setting the master or slave flag, as appropriate, and outputting voltage levels to the flip flops 382, 322 and 318 of FIG. 10 that will cause the appropriate one of an internal or external reference signal to be selected as the reference signal for entry of the contents of the counter 154 into the reference latch circuit 158 and for transmission of the internal reference signal or a zero voltage level to the base of transistor 312 in FIG. 10.

Returning to FIG. 17, in the first interrupt that occurs following the initial arbitration routine, the servo microcomputer 76 of the disc drive 34 will execute one of the phase/master, block 676, or phase/slave, block 678, modes of motor speed control. It will be useful to consider the case in which the disc drive 34 has selected the phase/slave mode of operation, a flow chart of which has been presented in FIG. 23. As shown therein, the phase/slave mode begins, block 680, with the inputting of the status register 126 followed by a determination, block 682, from the voltage level inputted from the tri-state gate 484, whether an index signal from the actuator control circuit 78 or a signal from the missing index detector was the source, with a reference signal, of the interrupt. If the index signal from the actuator control circuit has been lost, an error condition is outputted to the system microcomputer 80, block 684, for further transmission to the host computer 32 that the drive 34 is no longer ready to store or retrieve files, the lost index count in RAM is incremented and the servo microcomputer returns to the main program at the point A in FIGS. 16 and 23 to repeat the motor spin up procedure.

If the index signal has not been lost, the routine proceeds to a check, block 688, of the bit inputted from the tri-state gate 486 to similarly determine whether the external reference signal has been lost. If so, the slave flag is checked, block 690, to determine whether the disc drive has been designated a slave drive by the host computer 32. If so, an error condition is outputted to the system microcomputer 80, block 692, for transmission of an indication of a possible malfunction in a designated master. In either case, the first time flag is set, block 694, and the frequency mode of operation is selected, block 696. It will be noted that a circumstance in which this chain of events can occur is that the reference terminal of the drive has been connected to the ground terminal by a jumper as has been illustrated for the drive 38 in FIG. 2. In such case, as will be discussed below, the disc drive 34 will subsequently operate in the frequency mode to control the speed of the motor in relation to the time between consecutive index signals from the actuator control circuit 78.

If the reference signal has not been lost, the first time flag will be checked, block 698, to determine whether the current interrupt is the first interrupt in which the phase/slave mode of operation is being carried out following selection of the phase/slave mode so that initial values of the counts in the index and reference latch circuits will be needed to calculate a motor speed control word. If so, the interrupt exits through the data load routine shown in FIG. 19 as indicated by the program connection B in FIGS. 19 and 23. If not, a determination is made as to whether the reference signal is valid, block 700, by inputting the value in the reference latch circuit 158 and comparing it to the previously inputted value. If the difference between these values indicates the reference is valid, the motor speed control routine shown in FIG. 20 is executed, block 702 and the phase/slave mode execution is exited to the reset of the arbitration latch, block 626, shown in FIG. 17.

If the reference is invalid, the slave flag is checked, block 704, to determine whether the disc drive 34 has been designated a slave by the host computer 32. If so, an error condition is outputted to the system microcomputer 80 as indicated at block 706. In either event, the first time flag is set, block 708, and the frequency mode of motor speed control is selected for the next interrupt, block 710. Such selection is effected by entering the mode number corresponding to the frequency mode in the RAM address reserved for the such number, by outputting voltage levels to the flip flops 382, 322 and 318 of FIG. 10 to select an external reference signal as the reference signal for entering counts into the reference latch circuit 158 and to ground the base of the transistor 312, and by outputting voltage levels to the flip flops 390 and 392 of the interrupt circuit 124 to select the frequency mode of operation of such circuit.

In the case in which the disc drive 34 is placed in the frequency mode of motor control, either from the phase/slave mode as described above or from the phase/master mode as will be describe below, the operation of the disc drive 34 will be as has been described above to the decision block 631 in FIG. 18 in which the arbitration flag is checked. As noted above, after the initial arbitration routine has been executed, the arbitration flag is set (block 670 of FIG. 16). As a result, when the decision block 631 of FIG. 18 is reached, the routine will go to a check of whether a valid reference signal is available from another disc drive, block 712, in the same manner that the validity of a reference signal is checked in the phase/slave routine. If not, a routine that checks to determine whether the disc drive is to become a master drive is carried out. Such routine has been illustrated in FIG. 22 beginning at the program connection C also shown in FIG. 18.

Figure 22:
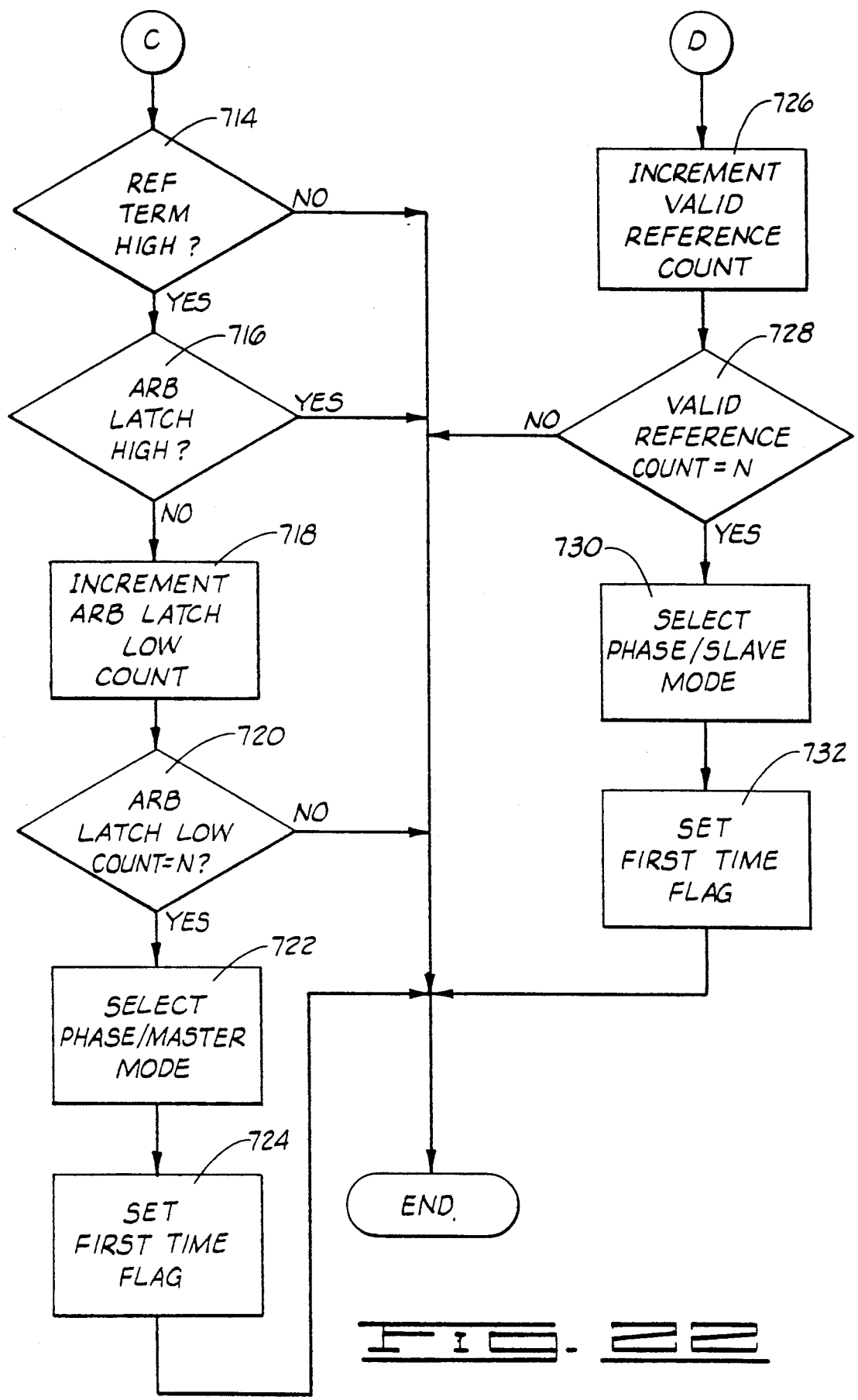
FIG. 22 is a flow chart of mode selection routines executed in the frequency mode of operation of the motor speed control circuit.
Figure 23:
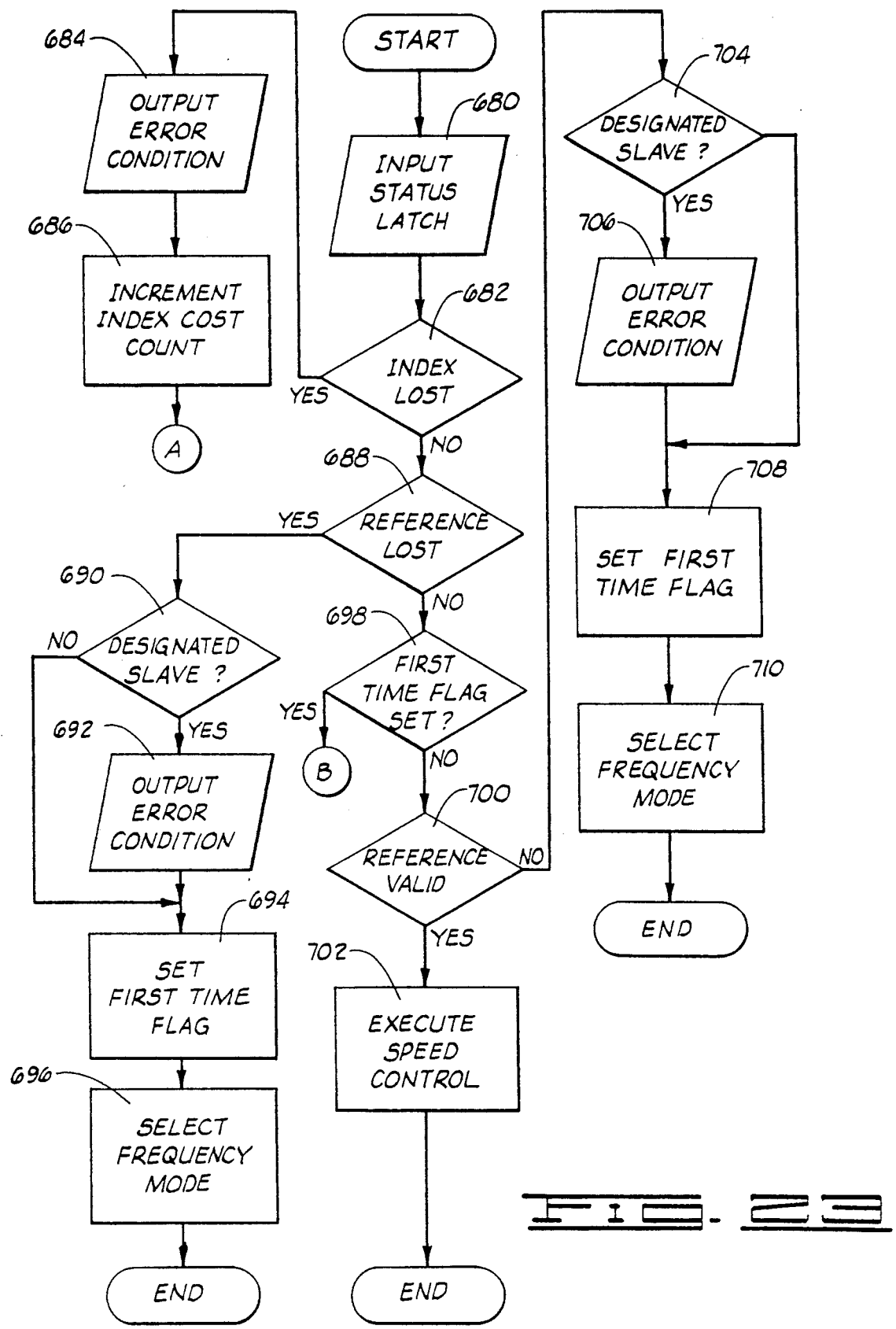
FIG. 23 is a flow chart corresponding to the phase/slave mode of operation of the motor speed control circuit.

In the master check routine shown in FIG. 22, the state of the reference terminal 42 is inputted from the status register 126 and checked to determine whether the reference terminal is high or low at block 714. If it is low, the presumption is that another disc drive is operating as a master drive and the routine ends with a return to the reset of the arbitration latch step of FIG. 17. It will be noted that grounding the reference terminal as shown for the disc drive 38 in FIG. 1 will always lead to this result and the disc drive will remain indefinitely in the frequency mode of motor speed control.

If the reference terminal is high, the arbitration latch 424 is checked at block 716 to determine whether the reference terminal is high because one other disc drive is acting as a master, a situation that will be indicated by a high voltage level on the Q output of the arbitration latch 494. If one disc drive is acting as a master, the output of the arbitration latch 424 will have been clocked high by a reference signal transmitted to the reference terminal 42 of the disc drive 34. If so, the disc drive 34 defers to the other disc drive by exiting the routine. If not, an address in memory for storage of an arbitration latch low count is incremented, block 718, and the value of such count is then checked, block 720, to see if it has reached a preselected value. If not, the routine exits. If so, the reference line will have been high for a number of motor revolutions corresponding to the preselected value with no other disc drive having caused the arbitration latch 424 to have been clocked high. Thus, the reference terminal is high because no disc drive of the system 30 is acting as a master drive. Accordingly, the phase/master mode is selected for the next interrupt, block 722, and implemented as has been described above so that the disc drive will assume the role of a master drive for the system 30. The first time flag is then set, block 724, for loading of initial values into the index and reference latch circuits 156 and 158, and the routine ends.

Returning to the frequency mode routine in FIG. 18, if a valid reference is available at the decision block 712, a slave check routine, beginning with the program connection C in FIGS. 18 and 22 is carried out. As shown in FIG. 22, the slave check routine begins with an increment of a valid reference count in a selected memory location, block 726, and a check, block 728, to determine whether the valid reference count has reached a preselected value. If not, the routine ends. Thus, the motor speed control circuit 108 will continue to operate in the frequency motor speed control mode for a number of motor revolutions equal to a selected number to insure that another disc drive has assumed the role of a master drive. When such number of motor revolutions has occurred, the phase/slave mode of operation is selected, block 730, and implemented in the motor speed control circuit 108 as has been described above. The first time flag is then set, block 732, for determination of initial index and reference counts in the latch circuits 156 and 158 and the routine ends.

Figure 24:
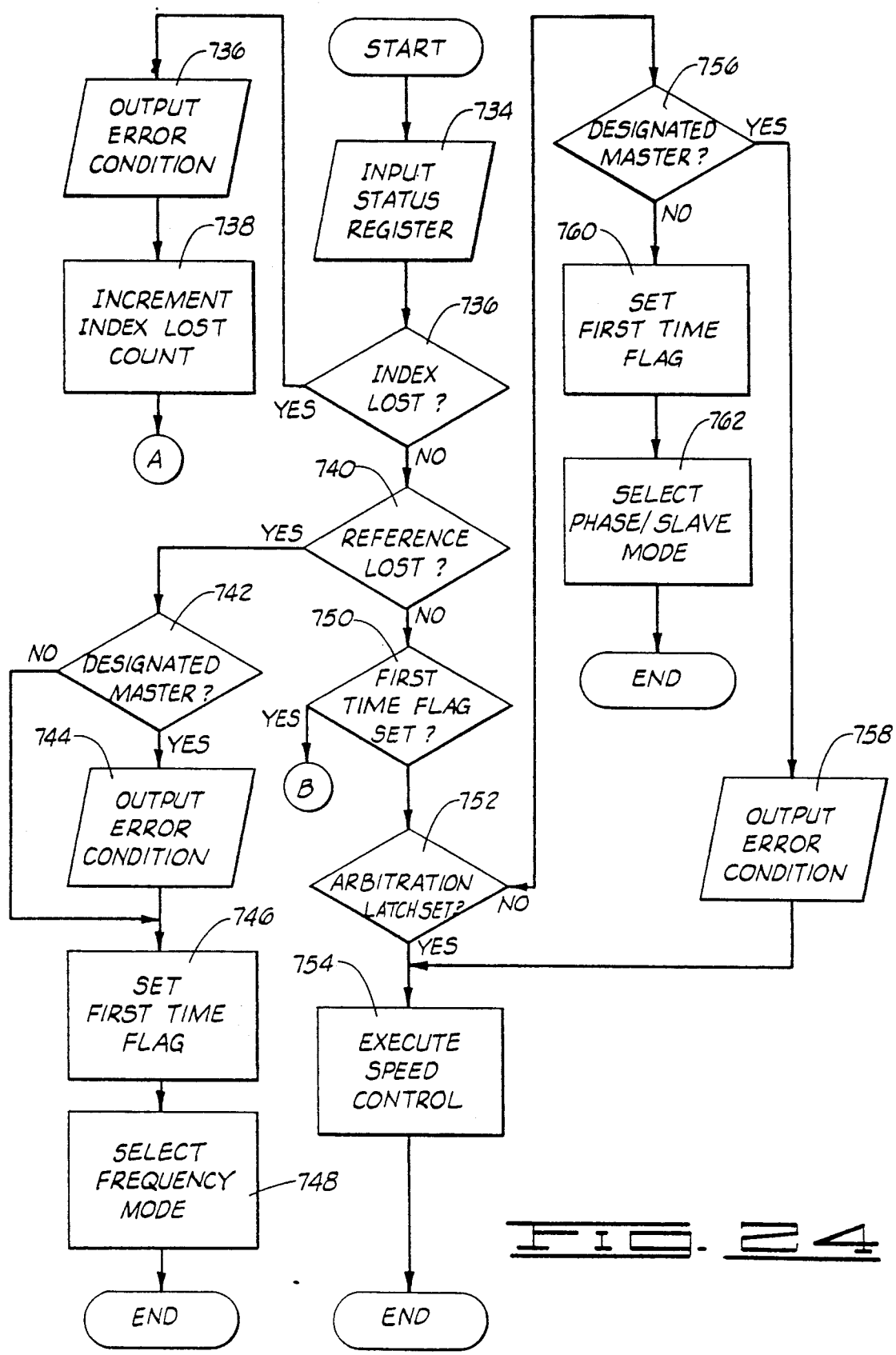
FIG. 24 is a flow chart corresponding to the phase/master mode of operation of the motor speed control circuit.

Referring now to FIG. 24, shown therein is the phase/master routine that is carried out during an interrupt at the block 676 of FIG. 17. As shown in FIG. 24, the phase/master routine begins with an input of the status register, block 734, for a check for a missing index signal, block 734, as in the phase/slave routine. If an index signal has not been received to initiate, with the internal reference signal, the interrupt in which the routine is executed, the servo microcomputer 76 outputs an error condition, block 736, to the system microcomputer 80, increments the lost index count, block 738, and returns to the start up procedure as described above.

A check is then made, block 740, of the voltage level that has been inputted from the tri-state gate 486 of the status register 126 to determine whether the reference signal, in this case from the internal reference generator 118, has been lost. If so, the master flag is checked to determine whether the disc drive is operating in the phase/master mode because of designation as a master drive by the host computer 32, block 742, and, if so, outputs an error condition to the system microcomputer 80, block 744, for transmission to the host computer. In either case, designated master or not, the first time flag is set, block 746, and the servo microcomputer 76 selects the frequency mode of motor speed control for subsequent interrupts, block 748, and configures the motor speed control circuit for frequency mode operation as has been discussed above. The mode execution routine then returns to the general interrupt routine of FIG. 17.

If the reference signals are being generated and are entering counts into the reference latch circuit 158, the first time flag is checked, block 750, to determine whether the phase/master mode routine is being executed for the first time since entry of the phase/master mode number in the selected RAM address utilized in the selection of the operation modes and, if so, the routine exits via the data load routine (connection B) shown in FIG. 19.

If initial values of the counts in the index and reference latch circuits 156 and 158 have been previously read, the bit inputted from the arbitration latch 494 in block 734 is read to determine whether another disc drive of the data storage system 30 might be operating as a master drive, block 752. Such circumstance will be indicated by a low voltage level at the Q output of the arbitration latch 494. As noted above, the presence of two interconnected disc drives acting as master drives will prevent low voltage signals received at the bases of the transistors 312 of the drives, during generation of an internal reference, from causing the reference terminal of either drive from going high. Each grounds the reference terminal of the other while such other is generating an internal reference signal. If no other disc drive is acting as a master drive, the disc drive 34 will execute the speed control routine, block 754, that has been illustrated in FIG. 20 and the servo microcomputer 76 returns to the general interrupt routine shown in FIG. 17.

If a second disc drive has assumed the role of a master drive, the servo microcomputer 76 of the disc drive 34 checks the master flag to determine whether the disc drive 34 is a master drive by designation, block 756, if so, and proceeds to the execution of the speed control routine after outputting an error condition to the system microcomputer 80, block 758, for transmission to the host computer. While the presence of a second disc drive acting as a master drive might pose a problem in so far as the data storage system as a whole is concerned, it will not interfere with the operation of an individual disc drive operating as a master because counts are entered into the reference latch circuit 158 in the phase/master mode in response to internal reference signals.

If the disc drive 34 has not been designated a master drive, it defers to the other disc drive to which it is connected via its reference terminal 42 and a jumper 54 by setting the first time flag, block 760, and selecting the phase/slave mode of motor speed control for subsequent interrupts, block 762.

As noted above, the host computer 32 may also provide the external reference signals utilized to synchronize the rotation of the discs of all of the disc drives of the system. For this purpose, all that is necessary is that the host computer 32 issue no command to any disc drive of the system designating it a master disc drive; that the jumper 54 be extended to the host computer 32 via the extension 58., and that the host computer be programmed to deliver external reference signals to the reference terminals of the disc drives of the system 30 via the jumper 54. In such case, all of the disc drives will defer to host computer to operate in the phase/slave mode as has been described above.

It will be clear that the present invention is well adapted to carry out the objects and attain the ends and advantages mentioned as well as those inherent therein.

While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive for storing files from a host computer, wherein said disc drive is of the type including a disc mounted on a motor for rotation about the axis of the disc, a transducer proximate a surface of the disc for reading servo information recorded on the disc surface, an actuator whereon the transducer is mounted for moving the transducer radially across the disc, and servo means, including a servo microprocessor, for radially positioning the transducer on the disc, wherein the servo means is further characterized as a means for generating an index signal indicative of a selected orientation of the disc and wherein the servo microcomputer is characterized as having a data bus for inputting and outputting data words to and from the servo microcomputer, a motor speed control circuit for controlling the rotational speed of the disc comprising:

counting means for providing counts indicative of time within each of a succession of time intervals equal to a selected period of rotation for the disc;

index latch means, electrically connected between the counting means and the servo means, for entering the count in the counting means and providing said count to the servo microcomputer data bus in response to an index signal from the servo means;

motor drive means, electrically connected between the servo microcomputer data bus and the motor, for providing electrical power to the motor at an amplitude determined by a speed control word received by the motor drive means from the servo microcomputer; and interrupt means, electrically connected between the index latch means and the servo microcomputer, for providing an interrupt signal to the servo microcomputer in a frequency mode of operation of the interrupt means corresponding to a frequency mode of operation of the motor speed control circuit in response to entry of a count into the index latch means, wherein the servo microcomputer is programmed to input the count in the index latch means, determine the speed control word in relation to successive counts in the index latch means and output the speed control word to the motor drive means in response to an interrupt signal received by the servo microcomputer in the frequency mode of operation of the motor speed control circuit.

2. The motor speed control circuit of claim 1 wherein the motor drive means comprises:

a control word entry latch for receiving the control word from the servo microcomputer;

a control word output latch electrically connected to the control word entry latch for entering the control word in response to a control word transfer signal;

means for controlling the amplitude of electrical power supplied to the motor in response to the control word in the control word output latch; and means, electrically connected between the index latch means and the control word output latch for generating the control word transfer signal concurrently with entry of a count from the counting means into the index latch means.

3. The motor speed control circuit of claim 1 further comprising:

a reference terminal for receiving an external reference signal from one of the host computer and another disc drive;

reference latch means, electrically connected to the counting means, responsive to a reference signal for entering the count in the counting means and providing said count to the servo microcomputer data bus;

means, operable by the servo microcomputer, for transmitting the external reference signal to the reference latch means in a phase/slave mode of operation of the motor speed control circuit;

wherein the interrupt means is further characterized as a means for providing an interrupt signal to the servo microcomputer in response to entry of counts into both the index and reference latch means in a phase mode of operation of the interrupt means; wherein the motor speed control circuit is further comprised of means, operable by the servo microcomputer, for selectively placing the interrupt means in one of the frequency and phase modes of operation; and wherein the servo microcomputer is programmed to input the counts in the index latch means and reference latch means, determine the speed control word in relation to the difference between counts in the index latch means and reference latch means, and output the speed control word to the motor drive means in response to an interrupt signal received by the servo microcomputer in the phase/slave mode of operation of the motor speed control circuit.

4. The motor speed control circuit of claim 3 wherein the motor drive means comprises:

a control word entry latch for receiving the control word from the servo microcomputer;

a control word output latch electrically connected to the control word entry latch for entering the control word in response to a control word transfer signal;

means for controlling the amplitude of electrical power supplied to the motor in response to the control word in the control word output latch; and means, electrically connected between the index latch means and the control word output latch for generating the control word transfer signal concurrently with entry of a count from the counting means into the index latch means.

5. The motor speed control circuit of claim 3 further comprising:

an internal reference generator electrically connected to the counting means for generating an internal reference signal during each of said times intervals equal to a selected period of rotation of the disc;

means, operable by the servo microcomputer, for transmitting the internal reference signal to the reference terminal in a phase/master mode of operation of the motor speed control circuit;

wherein the means for transmitting the external reference signal to the reference latch means is further characterized as a means for transmitting a selected one of the internal and external reference signals to the reference latch means; and wherein the servo microcomputer is programmed to input the counts in the index latch means and reference latch means, determine the speed control word in relation to the difference between counts in the index latch means and reference latch means, and output the speed control word to the motor drive means in response to an interrupt signal received by the servo microcomputer in the phase/master mode of operation of the motor speed control circuit.

6. The motor speed control circuit of claim 5 wherein the motor drive means comprises:
   a control word entry latch for receiving the control word from the servo microcomputer;
   a control word output latch electrically connected to the control word entry latch for entering the control word in response to a control word transfer signal;
   means for controlling the amplitude of electrical power supplied to the motor in response to the control word in the control word output latch; and
   means, electrically connected between the index latch means and the control word output latch for generating the control word transfer signal concurrently with entry of a count from the counting means into the index latch means.

7. A data storage system for a host computer comprising:
   a plurality of disc drives, wherein each of said disc drive comprises:
   a motor;
   a disc mounted on the rotor of the motor for rotation about the axis of the disc;
   a transducer proximate a surface of the disc for reading servo information recorded on the disc surface;
   an actuator whereon the transducer is mounted for moving the transducer radially across the disc surface,
   servo means, including a servo microprocessor, for radially positioning the transducer on the disc, wherein the servo means is further characterized as a means for generating an index signal indicative of a selected orientation of the disc and wherein the servo microcomputer is characterized as having a data bus for inputting and outputting data words to and from the servo microcomputer; and
   a motor speed control circuit for controlling the rotational speed of the disc, the motor speed control circuit comprising:
      counting means for providing counts indicative of time within each of a succession of time intervals equal to a selected period of rotation of the disc;
      index latch means, electrically connected between the counting means and the servo means, for entering the count in the counting means and providing said count to the servo microcomputer data bus in response to an index signal from the servo means;
      reference latch means, electrically connected to the counting means, responsive to a reference signal for entering the count in the counting means and providing said count to the servo microcomputer data bus;
      an internal reference generator electrically connected to the counting means for generating an internal reference signal during each of said times intervals equal to a selected period of rotation of the disc;
      a reference terminal;
      means, operable by the servo microcomputer, for transmitting the internal reference signal to the reference terminal in a phase/master mode of operation of the speed control circuit, whereby a disc drive in said phase/master mode provides an external reference for all disc drives of the data storage system;
      a reference terminal interface for detecting the presence of an external reference signal on the reference terminal;
      reference selection means, electrically connected between the internal reference generator, the reference terminal interface and the reference latch means, the reference selection means operable by the servo microcomputer for transmitting the internal reference signal to the reference latch means in the phase/master mode of operation of the speed control circuit while transmitting external reference signals to the reference latch means in a phase/slave mode of operation of the speed control circuit;
      interrupt means, electrically connected between the index latch means, the reference latch means and the servo microcomputer for interrupting providing an interrupt signal to the servo microcomputer in response to entry of the count in the counting means into the index latch means and entry of the count in the counting means into the reference latch means;
      reference terminal status means, electrically connected between the reference terminal, the reference terminal interface, and the servo microcomputer for providing the servo microcomputer with an indication of the current electrical state of the reference terminal and indications of changes in the state of the reference terminal between interrupts of the servo microcomputer; and
      motor drive means electrically connected between the servo microcomputer data bus and the motor, for providing electrical power to the motor at an amplitude determined by a speed control word received by the motor drive means from the servo microcomputer; and
   means for interconnecting the reference terminals of the disc drives;
   wherein the servo microcomputers of the disc drives are each programmed to input the counts in the index and reference latch means, determine the speed control word in relation to the difference between the counts in the index latch means and the reference latch means, output the speed control word to the motor drive means, input the contents of the reference terminal status means, and place the motor speed control circuit in a selected one of the phase/master and phase/slave states of operation for the motor speed control circuit in relation to the contents of the reference terminal status means in response to an interrupt signal.

8. The data storage system of claim 7 wherein the means for interconnecting the reference terminals of the disc drives is further characterized as a means for connecting the reference terminals to the host computer and wherein the host computer is programmed to provide an external reference signal to said reference terminals.

9. The data storage device of claim 7 wherein the motor drive means of the motor speed control circuit of each disc drive comprises:

a control word entry latch for receiving the control word from the servo microcomputer;

a control word output latch electrically connected to the control word entry latch for entering the control word in response to a control word transfer signal;

means for controlling the amplitude of electrical power supplied to the motor in response to the control word in the control word output latch; and means, electrically connected between the index latch means and the control word output latch for generating the control word transfer signal concurrently with entry of a count from the counting means into the index latch means.

10. A method for synchronizing the operation of a plurality of disc drives which each comprise a data storage disc mounted on a motor for rotation of the disc about the disc, the method comprising the steps of:

generating in each disc drive an index signal indicative of a selected orientation of the disc of the drive;

generating in each disc drive a reference signal at intervals equal to a selected rate of rotation of the discs for the disc drives;

interconnecting the disc drives to enable each disc drive to sense the generation of a reference signal in one disc drive by the other disc drives;

periodically generating an interrupt signal in each disc drive;

operating each disc drive in response to the interrupt signal to transmit the reference signal generated thereby to the remaining disc drives in the absence of a reference signal received from another disc drive prior to generation of the interrupt signal, whereby one disc drive will provide a master reference signal for all disc drives while suppressing the transmission of reference signals by the remaining disc drives; and controlling the speed of the motor of each disc drive in relation to the time interval between generation of the master reference signal and generation of the index signal within the disc drive.

* * * * *

UNITED STATES PATENT AND TRADEMARK OFFICE
CERTIFICATE OF CORRECTION

PATENT NO. : 5,249,254
DATED : September 28, 1993
INVENTOR(S) : Robert D. Murphy, David C. Waugh, Mark A. Hickl, and Clyde E. Goodner, III It is certified that error appears in the above-indentified patent and that said Letters Patent is hereby corrected as shown below:

Column 1, line 23, after "system" insert a comma --,--;

Column 1, line 33, after "drives" delete the period "." and insert a comma --,--;

Column 4, line 67, after "start" delete "u" and substitute therefor --up--;

Column 6, line 49, delete "9" and substitute therefor --98--;

Column 8, line 29, delete "divide-16" and substitute therefor --divide-by-16--; and Column 23, line 57, delete "ant" and substitute therefor --and--.

Signed and Sealed this

Seventh Day of June, 1994

BRUCE LEHMAN

*Attest:*

*Attesting Officer*     *Commissioner of Patents and Trademarks*